US012027297B2

(12) United States Patent
Okano et al.

(10) Patent No.: US 12,027,297 B2
(45) Date of Patent: Jul. 2, 2024

(54) INDUCTOR ELEMENT AND MANUFACTURING METHOD FOR INDUCTOR ELEMENT

(71) Applicant: Murata Manufacturing Co., Ltd., Nagaokakyo (JP)

(72) Inventors: Tomoki Okano, Nagaokakyo (JP); Keisuke Teranishi, Nagaokakyo (JP); Tsutomu Ishige, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 861 days.

(21) Appl. No.: 17/031,993

(22) Filed: Sep. 25, 2020

(65) Prior Publication Data

US 2021/0020352 A1 Jan. 21, 2021

Related U.S. Application Data

(63) Continuation of application No. PCT/JP2019/000578, filed on Jan. 10, 2019.

(30) Foreign Application Priority Data

Apr. 4, 2018 (JP) ................................ 2018-072095

(51) Int. Cl.
*H01F 27/28* (2006.01)
*H01F 27/24* (2006.01)
(Continued)

(52) U.S. Cl.
CPC ............ *H01F 27/28* (2013.01); *H01F 27/24* (2013.01); *H01F 41/0206* (2013.01); *H01F 41/04* (2013.01)

(58) Field of Classification Search
CPC ...... H01F 27/28; H01F 27/24; H01F 41/0206; H01F 41/04; H01F 27/245; H01F 27/306;
(Continued)

(56) References Cited

U.S. PATENT DOCUMENTS 5,430,613 A * 7/1995 Hastings ................ H01F 41/16 336/200
5,543,773 A * 8/1996 Evans ..................... H01F 30/16 336/200
(Continued)

FOREIGN PATENT DOCUMENTS

JP 06-302437 A 10/1994
JP 11-329866 A 11/1999
(Continued)

OTHER PUBLICATIONS

Official Communication issued in International Patent Application No. PCT/JP2019/000578, mailed on Apr. 9, 2019.

*Primary Examiner* — Mang Tin Bik Lian
(74) *Attorney, Agent, or Firm* — Keating & Bennett, LLP

(57) ABSTRACT

An inductor element includes a magnetic body core provided with a through-hole, and a coil inserted through the through-hole and wound around the magnetic body core a plurality of times. The coil includes three bonding portions located on one side in a thickness direction of the magnetic body core. The three bonding portions are located on a first virtual plane that partially intersects with the coil.

18 Claims, 27 Drawing Sheets

(51) Int. Cl.
*H01F 41/02* (2006.01)
*H01F 41/04* (2006.01)

(58) Field of Classification Search
CPC .... H01F 27/2847; H01F 17/04; H01F 27/303; H01F 17/06; H01F 17/062; H01F 2038/035
See application file for complete search history.

(56) References Cited

U.S. PATENT DOCUMENTS

| | | | | |
|---|---|---|---|---|
| 9,754,714 | B2 * | 9/2017 | Quilici | H01F 27/306 |
| 2002/0075118 | A1 * | 6/2002 | Klaassen | H01F 37/00<br>336/212 |
| 2009/0160596 | A1 * | 6/2009 | Yang | H01F 27/2895<br>336/208 |
| 2015/0235753 | A1 * | 8/2015 | Chatani | H01F 41/046<br>336/200 |
| 2016/0181007 | A1 * | 6/2016 | Shiokawa | H01F 41/08<br>29/606 |

FOREIGN PATENT DOCUMENTS

| | | | |
|---|---|---|---|
| JP | 2003-347130 | A | 12/2003 |
| JP | 2004-087854 | A | 3/2004 |
| JP | 2006-351764 | A | 12/2006 |
| JP | 2016-046390 | A | 4/2016 |

* cited by examiner

INDUCTOR ELEMENT AND MANUFACTURING METHOD FOR INDUCTOR ELEMENT

CROSS REFERENCE TO RELATED APPLICATIONS

This application claims the benefit of priority to Japanese Patent Application No. 2018-072095 filed on Apr. 4, 2018 and is a Continuation Application of PCT Application No. PCT/JP2019/000578 filed on Jan. 10, 2019. The entire contents of each application are hereby incorporated herein by reference.

BACKGROUND OF THE INVENTION

1. Field of the Invention

The present invention relates to an inductor element and a manufacturing method for an inductor element.

2. Description of the Related Art

An inductor component including a magnetic core, a plurality of via conductors, and a plurality of conductors has been proposed (see Japanese Unexamined Patent Application Publication No. 2016-046390, for example). Here, the magnetic core has a flat rectangular parallelepiped shape, and is provided with a plurality of via holes that penetrate therethrough in the thickness direction thereof. The plurality of via conductors each has a pin shape, is inserted into the plurality of via holes of the magnetic core, respectively, and both end portions in the longitudinal direction protrude from both surface sides in the thickness direction of the magnetic core. A plurality of surface conductors each has a long and narrow plate shape, is arranged along one main surface in the thickness direction of the magnetic core, and electrically connects respective end portions of the two via conductors exposed on the main surface side to each other.

When the inductor component disclosed in Japanese Unexamined Patent Application Publication No. 2016-046390 is manufactured, a plurality of via conductors and a plurality of surface conductors are connected by welding in some cases. In this case, for example, after performing a step of welding each via conductor and each surface conductor to each other by using a laser welding technique in a state where one surface side of the magnetic core is turned upward, a step of turning the magnetic core over is performed, and then a step of welding each via conductor and each surface conductor to each other is performed in a state where the other surface side of the magnetic core is turned upward. In this case, it is necessary to pass through at least three steps in order to connect each via conductor and each surface conductor, and it is required to simplify the manufacturing steps by reducing the number of steps. Furthermore, in the inductor component disclosed in Japanese Unexamined Patent Application Publication No. 2016-046390, bonding portions between respective via conductors and respective surface conductors are present on both surface sides of the magnetic core, and there are at least twice as many bonding portions as the plurality of via conductors. Since the bonding portion between the via conductor and the surface conductor as described above has a higher resistance value than the portion of the via conductor and the surface conductor other than the bonding portion, there is a risk that energy loss in the inductor component will be increased by an amount corresponding thereto.

SUMMARY OF THE INVENTION

Preferred embodiments of the present invention provide inductor elements and manufacturing methods for inductor elements that are each able to simplify manufacturing steps and reduce a resistance value.

In order to provide the above-described features and advantages, an inductor element according to a preferred embodiment of the present invention includes a magnetic body core provided with a first through-hole; and a coil inserted through the first through-hole and wound around the magnetic body core a plurality of times, in which the coil includes a plurality of bonding portions located on one side in a thickness direction of the magnetic body core, and the plurality of bonding portions are located on a first virtual plane that partially intersects with the coil.

Furthermore, an inductor element according to a preferred embodiment of the present invention may include a structure in which the plurality of bonding portions are provided, by respectively bonding a plurality of first bonding surfaces of a same number as the plurality of bonding portions and a plurality of second bonding surfaces respectively making surface contact with the plurality of first bonding surfaces, and the plurality of first bonding surfaces and the plurality of second bonding surfaces are located on the first virtual plane.

Furthermore, an inductor element according to a preferred embodiment of the present invention may include a structure in which the magnetic body core further includes a second through-hole, the coil includes a plurality of first portions, a plurality of second portions, a third portion, and a fourth portion each of which has a flat plate shape, the plurality of first portions are provided to be inserted through the first through-hole, the plurality of second portions are provided to be inserted through the second through-hole, the third portion connects one end of each of the plurality of first portions in a longitudinal direction and one end of each of the plurality of second portions in a longitudinal direction, and the fourth portion connects another end of each of the plurality of first portions in the longitudinal direction and another end of each of the plurality of second portions in the longitudinal direction.

Furthermore, an inductor element according to a preferred embodiment of the present invention may include a structure in which the plurality of bonding portions are located only on one side of the first through-hole and the second through-hole of the magnetic body core in a penetration direction.

Furthermore, an inductor element according to a preferred embodiment of the present invention may include a structure in which the plurality of first portions, the plurality of second portions, the third portion, and the fourth portion are defined by a same first conductor plate.

Furthermore, an inductor element according to a preferred embodiment of the present invention may include a structure in which the plurality of first portions, the plurality of second portions, and the fourth portion are defined by a same second conductor plate, and the third portion is defined by a third conductor plate that is different from the second conductor plate.

Furthermore, an inductor element according to a preferred embodiment of the present invention may include a structure in which the coil includes a plurality of first conductor pieces provided on the one side of the magnetic body core in the thickness direction, a plurality of second conductor pieces provided on another side of the magnetic body core in the thickness direction, and at least one of the plurality of second conductor pieces includes a protruding portion that protrudes in the thickness direction and is bonded to at least one of the plurality of first conductor pieces.

A manufacturing method for an inductor element according to a preferred embodiment of the present invention is a manufacturing method for an inductor element including a magnetic body core provided with a first through-hole, and a coil inserted through the first through-hole, wound around the magnetic body core a plurality of times, and includes a plurality of first portions, a plurality of second portions, a third portion, and a fourth portion each of which has a flat plate shape, the manufacturing method includes: a first base material forming step of forming, by processing a first conductor plate, a first base material including a fifth portion having a long and narrow shape and defining and functioning as a base of the fourth portion, and a plurality of sixth portions each having a long and narrow shape and a plurality of seventh portions each having a long and narrow shape that are respectively continuous to both ends of the fifth portion in a longitudinal direction, and define and function as bases of the first portions, and the second portions and the third portion, respectively; a first bending step of bending the plurality of sixth portions and the plurality of seventh portions in a third direction along a thickness direction of the fifth portion; an inserting step of inserting at least one group of the plurality of sixth portions and the plurality of seventh portions through the first through-hole of the magnetic body core; a second bending step of bending at least one group of tip end portions of the plurality of sixth portions and tip end portions of the plurality of seventh portions to be brought into contact with the tip end portions of another group, and locating a plurality of contact portions between the tip end portions of the plurality of sixth portions and the tip end portions of the plurality of seventh portions in a region between a same first virtual plane at least partially intersecting with the plurality of sixth portions or the plurality of seventh portions and a same second virtual plane parallel or substantially parallel to the first virtual plane and present at a position separated by a predetermined reference distance from the first virtual plane; and a welding step of welding, in a state in which the tip end portions of the sixth portions and the tip end portions of the seventh portions are respectively brought into contact with each other, by irradiating the tip end portions of the sixth portions and the tip end portions of the seventh portions with laser beams, the tip end portions of the sixth portions and the tip end portions of the seventh portions.

Furthermore, in a manufacturing method for an inductor element according to a preferred embodiment of the present invention, in which a length of a bonding portion between each of the tip end portions of the sixth portions and each of the tip end portions of the seventh portions in a direction orthogonal or substantially orthogonal to a thickness direction of the sixth portions and the seventh portions may be longer than a length in a width direction orthogonal or substantially orthogonal to the thickness direction of the sixth portions and the seventh portions and orthogonal or substantially orthogonal to an extension direction of the sixth portions and the seventh portions.

A manufacturing method for an inductor element according to a preferred embodiment of the present invention is a manufacturing method for an inductor element including a magnetic body core provided with a first through-hole, and a coil inserted through the first through-hole, wound around the magnetic body core a plurality of times, and includes a plurality of first portions, a plurality of second portions, a third portion, and a fourth portion each of which has a flat plate shape, the manufacturing method includes: a second base material forming step of forming, by processing a second conductor plate, a second base material including a plurality of eighth portions each having a long and narrow shape and defining and functioning as a base of the fourth portion, and a plurality of ninth portions each having a long and narrow shape and a plurality of tenth portions each having a long and narrow shape that are respectively continuous to both ends of the eighth portions in a longitudinal direction, and define and function as bases of the first portions and the second portions, respectively; a third base material forming step of forming, by performing punching processing on a third conductor plate, a third base material including an eleventh portion having a long and narrow shape and defining and functioning as a base of the third portion; a third bending step of bending the ninth portions and the tenth portions in a fourth direction along a thickness direction of the eighth portions, and locating tip end portions of the plurality of ninth portions and tip end portions of the plurality of tenth portions in a region between a same first virtual plane at least partially intersecting with the plurality of ninth portions or the plurality of tenth portions and a same second virtual plane parallel or substantially parallel to the first virtual plane and present at a position separated by a predetermined reference distance from the first virtual plane; an inserting step of inserting at least one group of the ninth portions and the tenth portions through the first through-hole; a contact step of bringing both end portions of the eleventh portion into contact with the tip end portions of the ninth portions and the tip end portions of the tenth portions, respectively; and a welding step of welding, in a state in which both the end portions of the eleventh portion are respectively brought into contact with the tip end portions of the ninth portions and the tip end portions of the tenth portions, by respectively irradiating both the end portions of the eleventh portion, the tip end portions of the ninth portions, and the tip end portions of the tenth portions with laser beams, both the end portions of the eleventh portion, and the tip end portions of the ninth portions and the tip end portions of the tenth portions, respectively.

Furthermore, in a manufacturing method for an inductor element according to a preferred embodiment of the present invention, in which a through-hole penetrating through the eleventh portion in a thickness direction may be provided in each of both the end portions of the eleventh portion.

A manufacturing method for an inductor element according to a preferred embodiment of the present invention is a manufacturing method for an inductor element including a magnetic body core provided with a first through-hole, and a coil inserted through the first through-hole, wound around the magnetic body core a plurality of times, includes a plurality of first conductor pieces provided on one side of the magnetic body core in a thickness direction and a plurality of second conductor pieces provided on another side of the magnetic body core in the thickness direction, and in which at least one of the plurality of second conductor pieces includes a protruding portion that protrudes in the thickness direction and is bonded to at least one of the plurality of first conductor pieces, the manufacturing method includes: a fourth base material forming step of forming, by processing a fourth conductor plate, a fourth base material defining and functioning as a base of the plurality of first conductor pieces; a fifth base material forming step of forming, by performing drawing processing on a fifth conductor plate, a fifth base material that has a plurality of protruding portions, in which tip end portions of the plurality of protruding portions are located in a region between a same first virtual plane at least partially intersecting with the plurality of protruding portions and a same second virtual plane parallel or substantially parallel to the first virtual plane and present at a position separated by a predetermined reference distance from the first virtual plane, and that defines and functions as a base of the plurality of second conductor pieces; an inserting step of inserting the plurality of protruding portions through the first through-hole; a contact step of bringing the plurality of protruding portions into contact with portions of the fourth base material corresponding to the plurality of first conductor pieces; and a welding step of welding, in a state in which the plurality of protruding portions is brought into contact with the fourth base material, by respectively irradiating tip end portions of the plurality of protruding portions with laser beams, the respective plurality of protruding portions and the fourth base material.

According to preferred embodiments of the present invention, a coil includes a plurality of bonding portions located on one side in a thickness direction of a magnetic body core. Accordingly, for example, the number of bonding portions in the coil as a whole is reduced as compared with a coil including a plurality of bonding portions on both one side and the other side in a thickness direction of the magnetic body core. Accordingly, since the resistance value of the coil is able to be reduced by an amount corresponding to reduction in the number of bonding portions each having a higher resistance value than the portion other than the bonding portions of the coil, energy loss in the inductor element is reduced. Furthermore, by locating all the plurality of bonding portions on one side of the magnetic body core in the thickness direction, since a step of turning the magnetic body core over is unnecessary in manufacturing steps of the inductor element, simplification of the manufacturing steps by reducing the number of steps is provided.

Furthermore, according to preferred embodiments of the present invention, the plurality of bonding portions are located on a first virtual plane that partially intersects with the coil. Accordingly, when the plurality of bonding portions are generated by a laser welding technique, since the frequency of focus adjustment of the laser beam is able to be significantly reduced, the steps of generating the plurality of bonding portions are able to be simplified by an amount corresponding thereto, and thus simplification of the manufacturing steps of the inductor element is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, a first preferred embodiment of the present invention will be described with reference to the drawings. An inductor element according to the first preferred embodiment includes a magnetic body core provided with two through-holes, and a coil having a long and narrow plate-shaped conductor portion wound in a plurality of times around a winding portion adjacent to or in a vicinity of the through-holes of the magnetic body core, in a state of being inserted through the two through-holes. Here, the coil includes a plurality of bonding portions located only on one side in the penetration direction of the through-holes of the magnetic body core. The penetration direction of the through-holes of the magnetic body core has the same meaning as the thickness direction of the magnetic body core. Additionally, the plurality of bonding portions is located on a first virtual plane that partially intersects with the coil. In the present specification and the like, the expression "the plurality of bonding portions are located on a first virtual plane that partially intersects with the coil" is not limited to a case where the plurality of bonding portions of the coil are located on strictly the same plane. The expression includes a case where the plurality of bonding portions of the coil are located in a region between the first virtual plane that partially intersects with the coil and a second virtual plane that is parallel or substantially parallel to the first virtual plane and present at a position separated by a predetermined reference distance from the first virtual plane. The reference distance is set, when the focal point of a laser beam applied during generating the plurality of bonding portions by a laser welding technique is located between the first virtual plane and the second virtual plane, to include the entire region in which energy density of the laser beam is substantially equal to or greater than an energy density threshold at which the coil is able to be dissolved.

Figure 1:
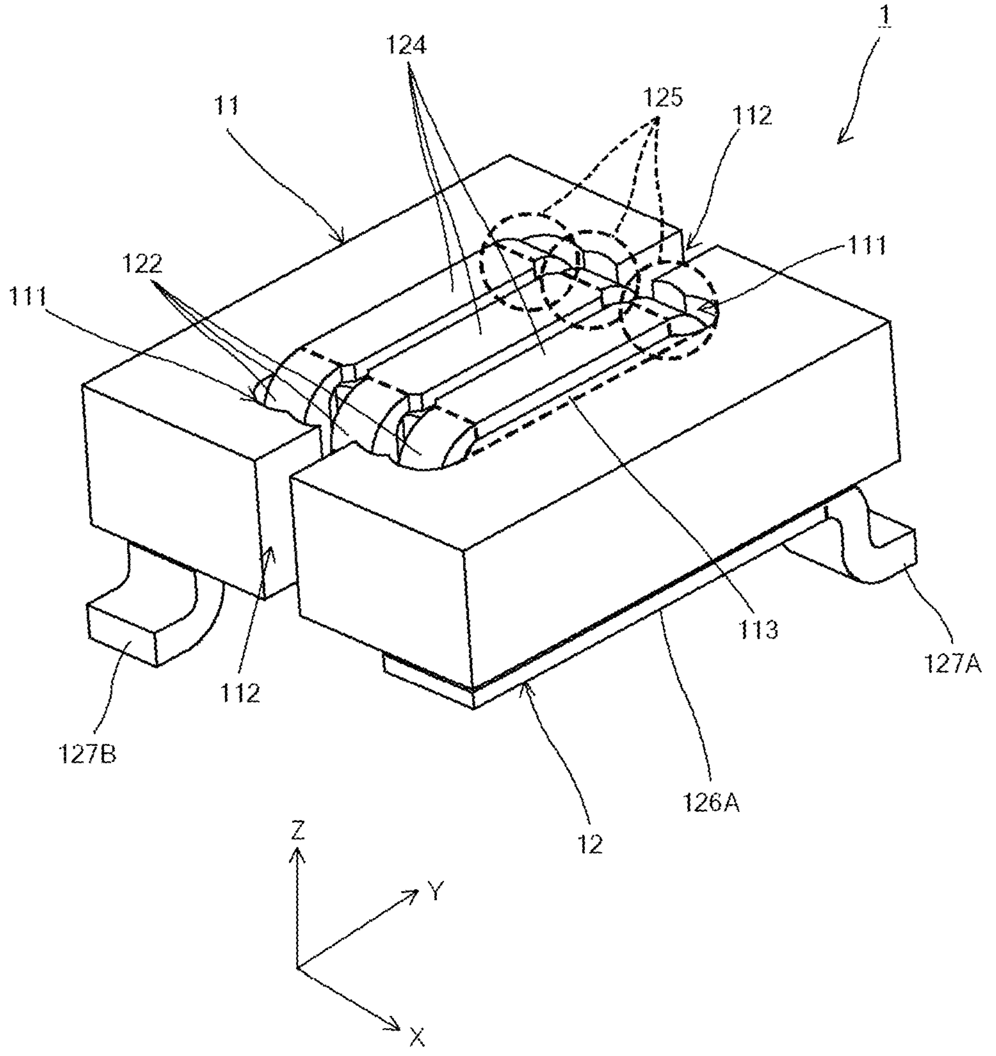
FIG. 1 is a perspective view of an inductor element according to a first preferred embodiment of the present invention.
Figure 2A:
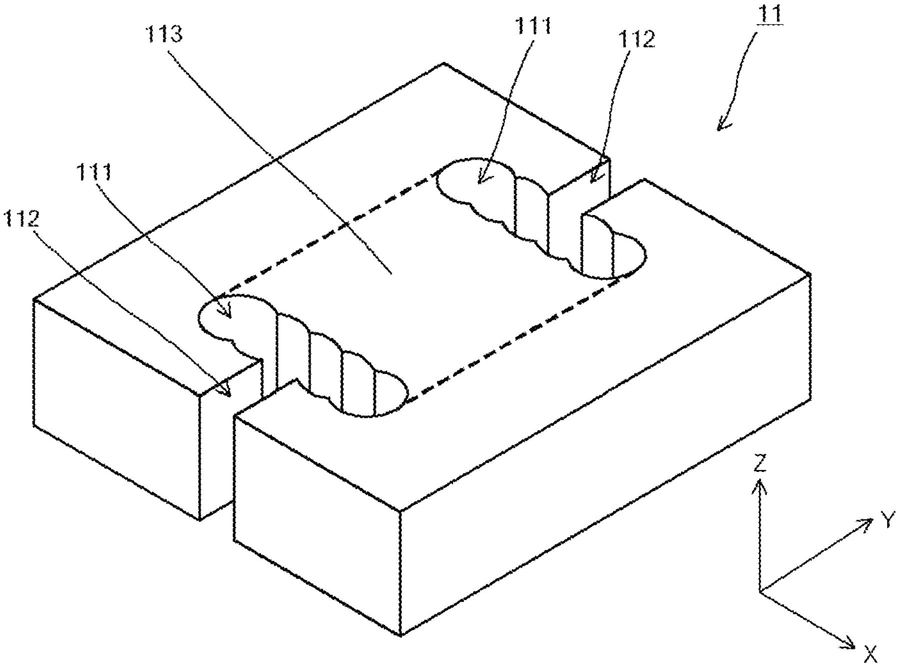
FIG. 2A is a perspective view of a magnetic body core according to the first preferred embodiment of the present invention.

As shown in FIG. 1, an inductor element 1 according to the first preferred embodiment includes a magnetic body core 11 and a coil 12. As shown in FIG. 2A, the magnetic body core 11 has a flat or substantially flat rectangular parallelepiped shape, and is provided with two through-holes 111 penetrating therethrough in the thickness direction thereof. Note that the following description will be providing while taking the thickness direction of the magnetic body core 11 as a Z-axis direction, and the directions along respective sides when the magnetic body core 11 is viewed in plan view as an X-axis direction and a Y-axis direction. Each of the two through-holes 111 has a long and narrow shape in plan view, and is provided in a form in which the longitudinal direction thereof is along the X-axis direction. The two through-holes 111 are respectively located at two places separated from each other in the Y-axis direction. A portion between the two through-holes 111 and adjacent to or in a vicinity of the through-holes 111 in the Y-axis direction of the magnetic body core 11 corresponds to a winding portion 113 around which the coil 12 is wound. Furthermore, the magnetic body core 11 may include two groove portions 112 respectively communicating with the two through-holes 111 along the Y-axis direction from the respective center portions of both side surfaces thereof in the Y-axis direction. The magnetic body core 11 may preferably include a magnetic material, for example, ferrite, permalloy, iron, or the like. The magnetic body core 11 is formed by, for example, laminating sheets including the magnetic material.

Figure 2B:
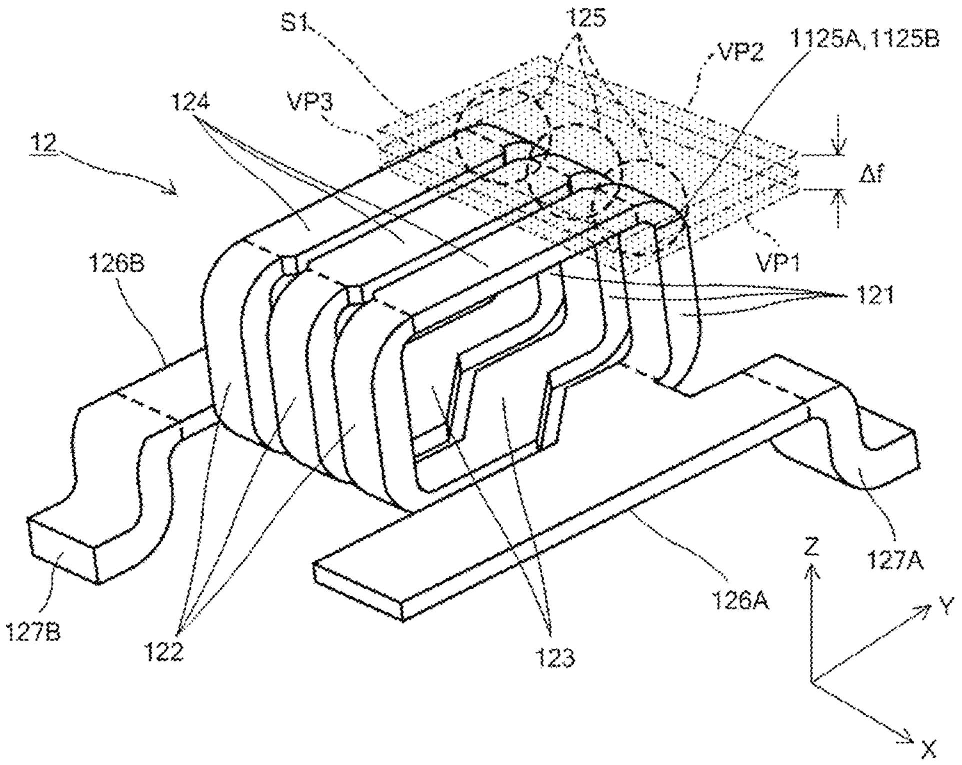
FIG. 2B is a perspective view of a coil according to the first preferred embodiment of the present invention.

As shown in FIG. 1, the coil 12 has a long and narrow plate shape, and is wound around the winding portion 113 of the magnetic body core 11 a plurality of times in a state of being inserted through the two through-holes 111 of the magnetic body core 11. Furthermore, the coil 12 include three bonding portions 125 that are located only on one side (+Z direction side) in the penetration direction of the through-holes 111 of the magnetic body core 11, that is, in the Z-axis direction. As shown in FIG. 2B, the coil 12 includes three first portions 121 each having a long and narrow flat plate shape, three second portions 122 each having a long and narrow flat plate shape, three third portions 124 each having a long and narrow flat plate shape, and two fourth portions 123 each having a long and narrow flat plate shape. The three first portions 121 are arrayed in the X-axis direction (first direction) which is the short-side direction thereof. The three second portions 122 are provided in the same number as that of the three first portions 121, and the longitudinal direction thereof is along the longitudinal direction of the first portions 121, and facing the first portions 121 in the Y-axis direction (second direction) and being arrayed in the X-axis direction. The three first portions 121 and the three second portions 122 are inserted through the through-holes 111 of the magnetic body core 11 shown in FIG. 2A, respectively, and face each other with the winding portion 113 of the magnetic body core 11 interposed between the three first portions 121 and the three second portions 122. As shown in FIG. 2B, the three third portions 124 are interposed between respective one ends of the three first portions 121 on the +Z direction side in the longitudinal direction and respective one ends of the second portions 122, which face the three first portions 121 in the Y-axis direction, on the +Z direction side in the longitudinal direction. The two fourth portions 123 are interposed between the respective other ends of the three first portions 121 on the −Z direction side and the respective other ends, on the −Z direction side, of the second portions 122 adjacent to or in a vicinity of the second portions 122, in the +X direction, that respectively face the three first portions 121 in the Y-axis direction. Here, of the two through-holes 111 of the magnetic body core 11, one through-hole 111 through which the first portions 121 are inserted corresponds to the first through-hole, and the other through-hole 111 through which the second portions 122 are inserted corresponds to the second through-hole.

Furthermore, the coil 12 includes two long plate-shaped extended portions 126A and 126B, and bent portions 127A and 127B each of which has a bent plate shape and which are respectively continuous to the two extended portions 126A and 126B. The extended portion 126A is continuous to an end portion, on the −Z direction side, of the first portion 121 located closest to the +X direction side among the three first portions 121. Furthermore, the extended portion 126B is continuous to an end portion, on the −Z direction side, of the second portion 122 located closest to the −X direction side among the three second portions 122. The coil 12 including the first portions 121, the second portions 122, the third portions 124, and the fourth portions 123 is defined by the same first conductor plate. As the material of the first conductor plate, a metal, for example, copper, stainless steel, iron, aluminum, or the like, may preferably be used. In addition, in order to add an insulation property to these materials, resin coating or nickel plating may be applied thereto.

Here, the three bonding portions 125 are located on the same first virtual plane VP1 that partially intersects with the coil 12. The expression "the three bonding portions 125 are located on the first virtual plane VP1 that partially intersects with the coil 12" here also includes a case where they are located in a region S1 between the first virtual plane VP1 and the same second virtual plane VP2 that is parallel or substantially parallel to the first virtual plane VP1 and present at a position separated by a predetermined reference distance Δf from the first virtual plane VP1. Here, the reference distance Δf is set, when the focal point of a laser beam applied during generating the three bonding portions 125 by a laser welding technique, which will be described later, is located between the first virtual plane VP1 and the second virtual plane VP2, to include the entire region in which energy density of the laser beam is equal or substantially equal to or greater than an energy density threshold at which the coil 12 is able to be dissolved. Specifically, the reference distance Δf is set, for example, to be equal or substantially equal to the focal depth of the laser beam. Furthermore, the three bonding portions 125 are respectively formed by bonding three first bonding surfaces 1125A and three second bonding surfaces 1125B in surface contact with the three first bonding surfaces 1125A, respectively. Additionally, the three first bonding surfaces 1125A and the three second bonding surfaces 1125B are located in the same third virtual plane VP3 that is parallel or substantially parallel to the first virtual plane VP1 and the second virtual plane VP2 and is located between the first virtual plane VP1 and the second virtual plane VP2. Note that the expression that the three first bonding surfaces 1125A and the three second bonding surfaces 1125B are located in the same third virtual plane VP3 also includes a case where the surfaces of the three first bonding surfaces 1125A and the three second bonding surfaces 1125B include unevenness in a micro-level. Furthermore, the expression also includes a case where the positions of the three bonding portions 125 deviate within a range of a tolerance in a direction orthogonal or substantially orthogonal to the third virtual plane VP3.

Figure 3A:
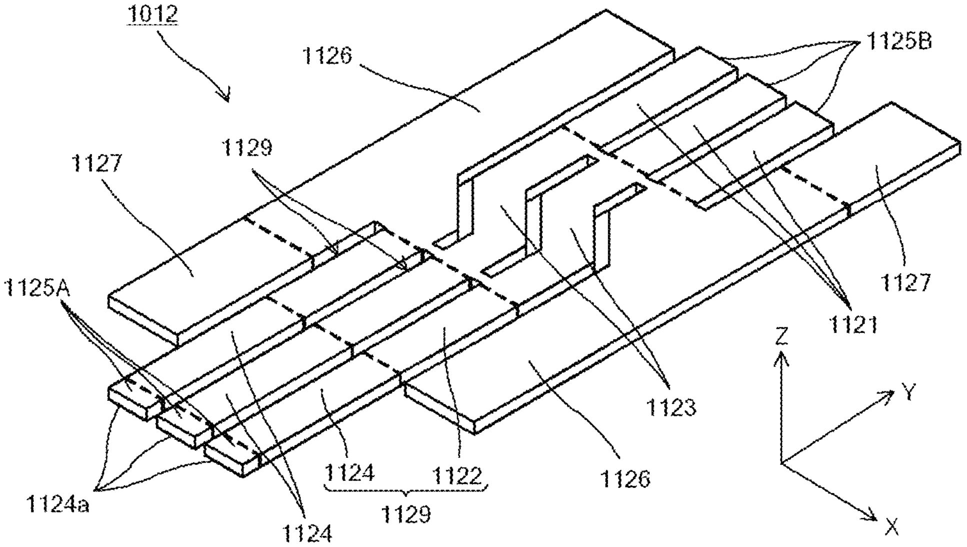
FIG. 3A is a perspective view of a first base material according to the first preferred embodiment of the present invention.

Next, a non-limiting example of a manufacturing method for the inductor element 1 according to the first preferred embodiment will be described with reference to FIG. 3A to FIG. 5. First, by processing the first conductor plate, as shown in FIG. 3A, a first base material forming step of forming a first base material 1012 including two fifth portions 1123, three sixth portions 1121, and three seventh portions 1129 is performed. Here, for example, the first base material 1012 is formed by performing punching processing on the first conductor plate. Each of the two fifth portions 1123 has a long and narrow plate shape, bends in the X-axis direction at the center portion in the longitudinal direction, and is a portion defining and functioning as a base of the fourth portion 123. Furthermore, each of the three sixth portions 1121 has a long and narrow substantially rectangular plate shape, and is a portion defining and functioning as a base of the first portion 121. Each of the three seventh portions 1129 includes a sub-portion 1122 that has a long and narrow rectangular or substantially rectangular plate shape and defines and functions as a base of the second portion 122, and a sub-portion 1124 that has a long and narrow substantially rectangular plate shape and defines and functions as a base of the third portion 124. One end portion of the sub-portion 1124 in the longitudinal direction thereof is, with respect to one end portion of the sub-portion 1122 that is continuous to the fifth portion 1123 in the longitudinal direction thereof, continuous to the other end portion on the opposite side. Note that the first base material 1012 includes two plate-shaped portions 1126 respectively defining and functioning as bases of the extended portions 126A and 126B, and two rectangular or substantially rectangular plate-shaped portions 1127 respectively defining and functioning as bases of the bent portions 127A and 127B. Note that in FIG. 3A, only a portion corresponding to one inductor element 1 in the first base material 1012 is shown. The first base material 1012 includes portions corresponding to a plurality of inductor elements 1 connected in a matrix shape by being connected to a plurality of bars (not shown) provided in parallel or substantially in parallel to one another with the portion 1127 interposed between the plurality of bars.

Figure 3B:
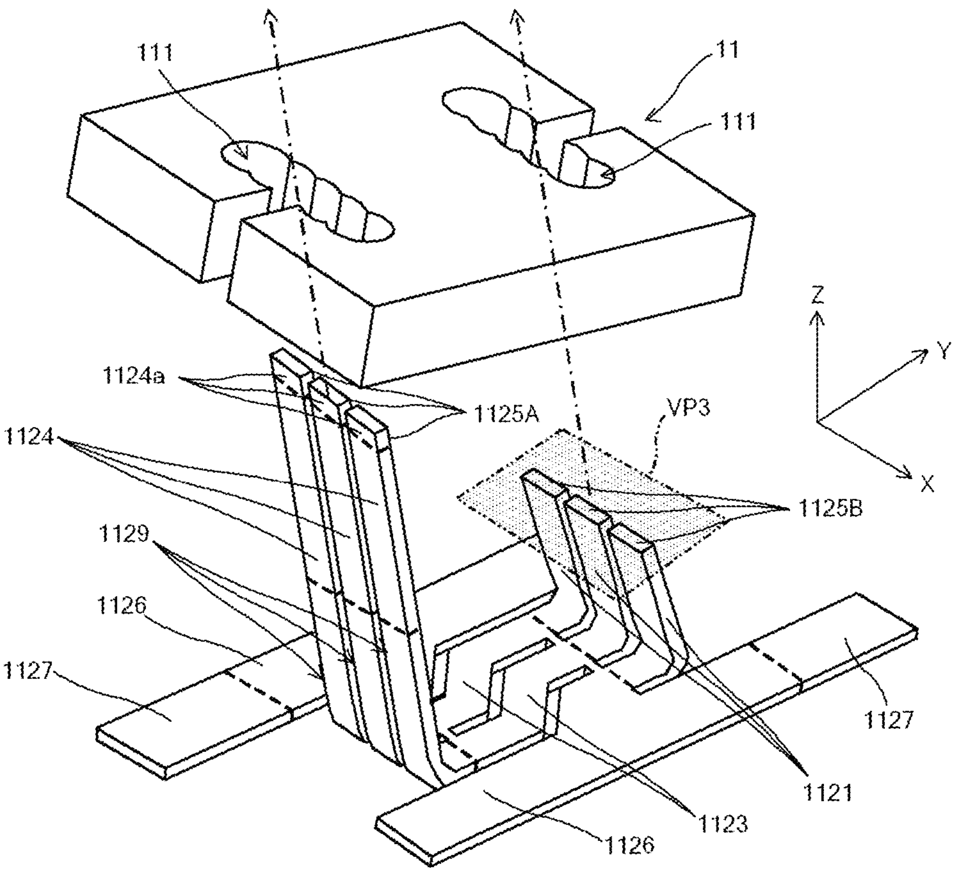
FIG. 3B is a perspective view showing an insertion step according to the first preferred embodiment of the present invention.

Next, as shown in FIG. 3B, a first bending step of bending the three sixth portions 1121 and the three seventh portions 1129 in the +Z direction, which is a third direction along the thickness direction of the fifth portion 1123, is performed.

Figure 4A:
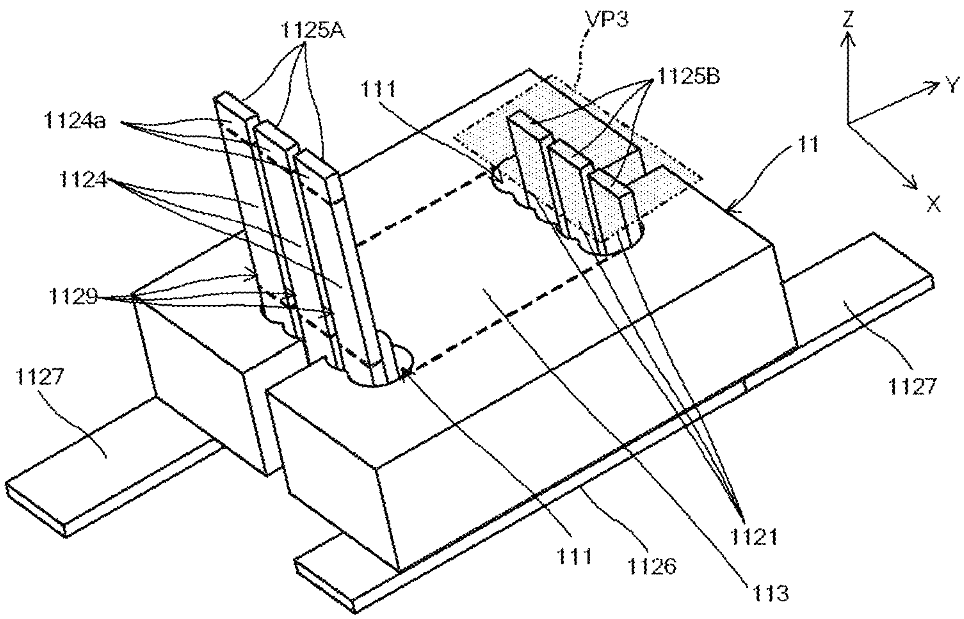
FIG. 4A is a perspective view showing the insertion step according to the first preferred embodiment of the present invention.

Subsequently, an inserting step of inserting the three sixth portions 1121 and the three seventh portions 1129 through the through-holes 111 of the magnetic body core 11, respectively, is performed. As a result, as shown in FIG. 4A, a state in which the three sixth portions 1121 and the three seventh portions 1129 are inserted through the two through-holes 111 of the magnetic body core 11, respectively, is provided.

Figure 4B:
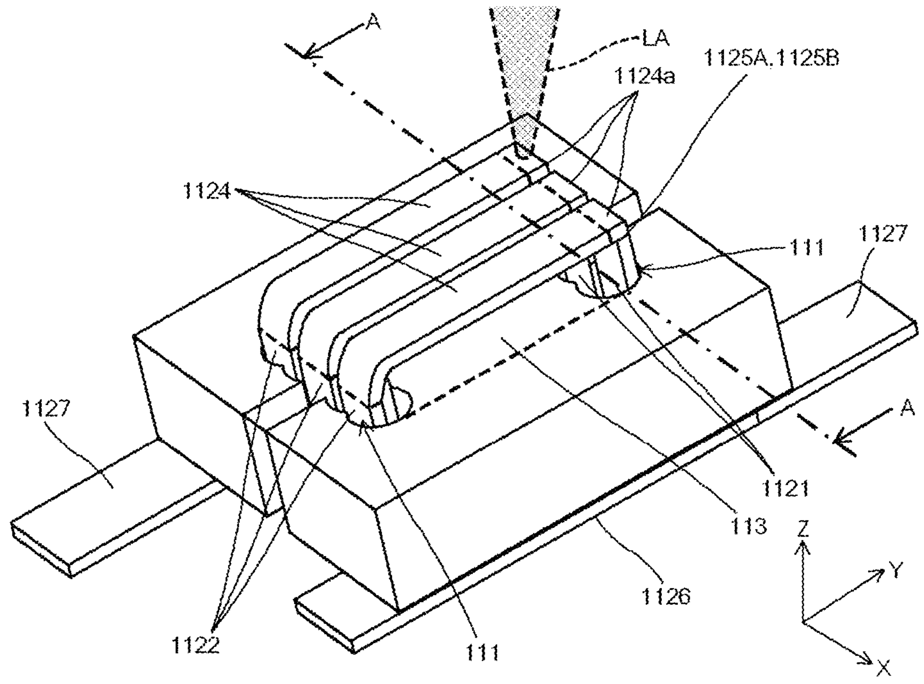
FIG. 4B is a perspective view showing a welding step according to the first preferred embodiment of the present invention.
Figure 5:
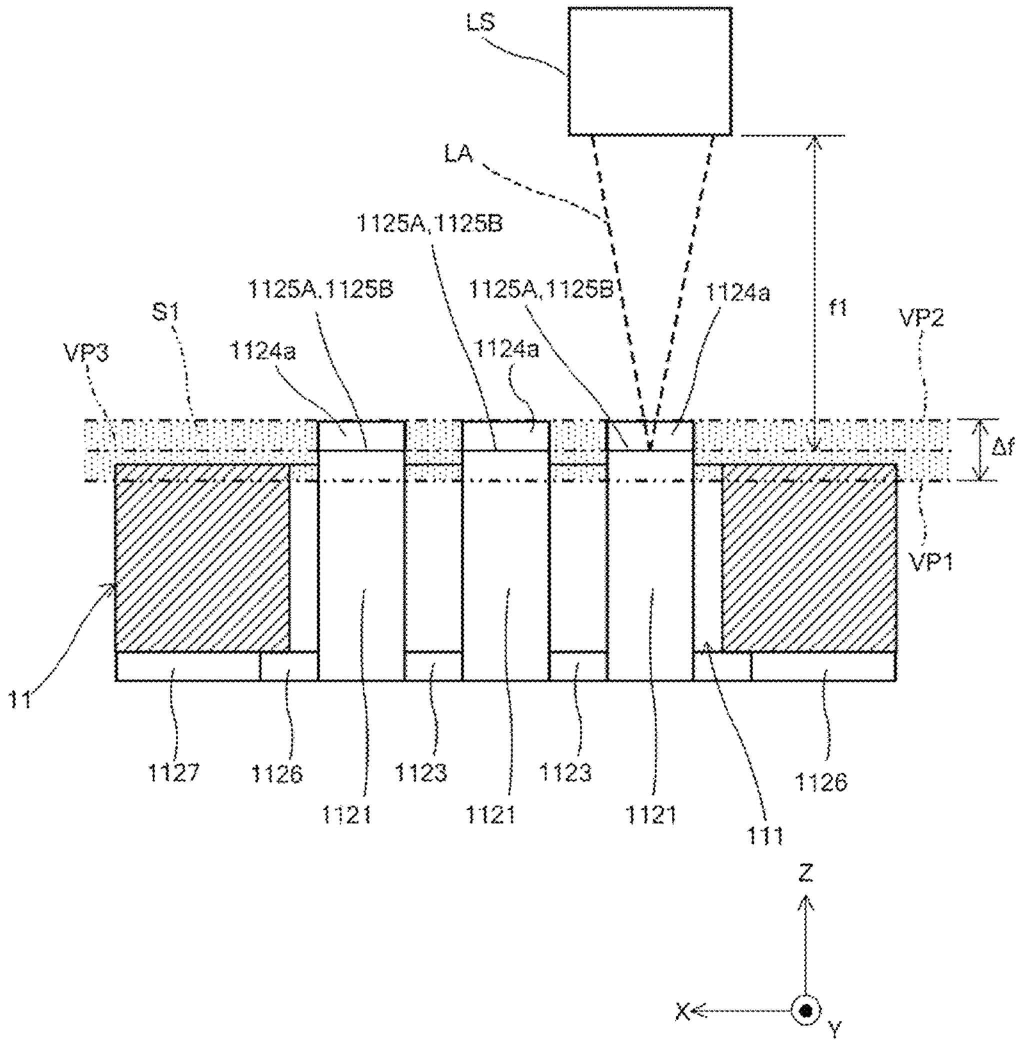
FIG. 5 is partial cross-sectional view showing the welding step according to the first preferred embodiment of the present invention, taken along a line A-A in FIG. 4B when viewed in an arrow direction.

Thereafter, a second bending step of bending each of the three seventh portions 1129 at the boundary portion between the two sub-portions 1122 and 1124, and bringing end portions 1124*a* of the three seventh portions 1129 into contact with the tip end portions of the three sixth portions 1121, respectively, as shown in FIG. 4B, is performed. At this time, the second bonding surface 1125B at the tip end portion of the sixth portion 1121 and the first bonding surface 1125A corresponding to one surface in the thickness direction of the end portion 1124*a* of the seventh portion 1129 make surface contact with each other. Here, the first bonding surface 1125A and the second bonding surface 1125B which form the contact portion between the tip end portion of the sixth portion 1121 and the end portion 1124*a* of the seventh portion 1129 are, as shown in FIG. 5, located in the region S1 between the first virtual plane VP1 that partially intersects with the three sixth portions 1121 and the same second virtual plane VP2 that is parallel or substantially parallel to the first virtual plane VP1 and present at the position separated by the predetermined reference distance Δf from the first virtual plane VP1. The first bonding surface 1125A and the second bonding surface 1125B are each located in the same third virtual plane VP3 that is parallel or substantially parallel to the first virtual plane VP1 and the second virtual plane VP2 and is located between the first virtual plane VP1 and the second virtual plane VP2. The boundary portion between the two sub-portions 1122 and 1124 is bent and bending R is formed. The sub-portion 1124 is not in contact with the winding portion 113 of the magnetic body core 11, and is provided with a predetermined interval. With this structure, the insulation property of the magnetic body core 11 and the coil 12 is able to be significantly improved.

Next, as shown in FIG. 4B and FIG. 5, in a state in which the tip end portion of the sixth portion 1121 and the end portion 1124*a* of the seventh portion 1129 are brought into contact with each other, by irradiating the tip end portion of the sixth portion 1121 and the end portion 1124*a* of the seventh portion 1129 with a laser beam LA radiated from a laser beam source LS, a welding step of welding the tip end portion of the sixth portion 1121 and the end portion 1124*a* of the seventh portion 1129 is performed. Here, as the laser beam source LS, for example, a $CO_2$ laser or a YAG laser may preferably be employed. With this, a composite structural body in which a plurality of magnetic body cores 11 is assembled to one first base material 1012 is formed.

Subsequently, by separating the portion 1127 from the bar, the above-described composite structural body is divided into element pieces respectively corresponding to the plurality of inductor elements 1. Then, by bending the portions 1127 of each of the element pieces, the bent portions 127A and 127B are formed. With this, the inductor element 1 is completed.

As described above, according to the inductor element 1 according to the first preferred embodiment, the coil 12 includes the three bonding portions 125 that are located only on the +Z direction side of the magnetic body core 11. Accordingly, for example, the number of bonding portions 125 in the coil 12 as a whole is reduced as compared with a coil including a plurality of bonding portions on both respective sides in the Z-axis direction of the magnetic body core 11. Accordingly, since the resistance value of the coil 12 is able to be reduced by an amount corresponding to reduction in the number of bonding portions 125 each having a higher resistance value than the portion other than the bonding portions 125 of the coil 12, energy loss in the inductor element 1 is reduced. Furthermore, by locating the plurality of bonding portions 125 only on the +Z direction side of the magnetic body core 11, since a step of turning the magnetic body core 11 over is unnecessary in manufacturing steps of the inductor element 1, simplification of the manufacturing steps by reducing the number of steps is provided.

Furthermore, according to the inductor element 1 according to the first preferred embodiment, the plurality of bonding portions 125 is located on the same first virtual plane VP1 that partially intersects with the coil 12. Accordingly, when the bonding portions 125 are generated, since the frequency of focus adjustment of the laser beam LA is able to be significantly reduced, the above-described welding step is able to be simplified by an amount corresponding thereto, and thus simplification of the manufacturing steps of the inductor element 1 is provided.

Furthermore, the first portions 121, the second portions 122, the third portions 124, and the fourth portions 123 according to the first preferred embodiment are defined by the same first conductor plate. Accordingly, the number of the bonding portions 125 of the coil 12 is able to be significantly reduced, and thus an increase in the resistance value of the coil 12 due to the bonding portion 125 is able to be significantly reduced.

Second Preferred Embodiment

An inductor element according to a second preferred embodiment of the present invention differs from that according to the first preferred embodiment in a point that a coil is defined by a second conductor plate and a third conductor plate that is different from the second conductor plate.

Figure 6A:
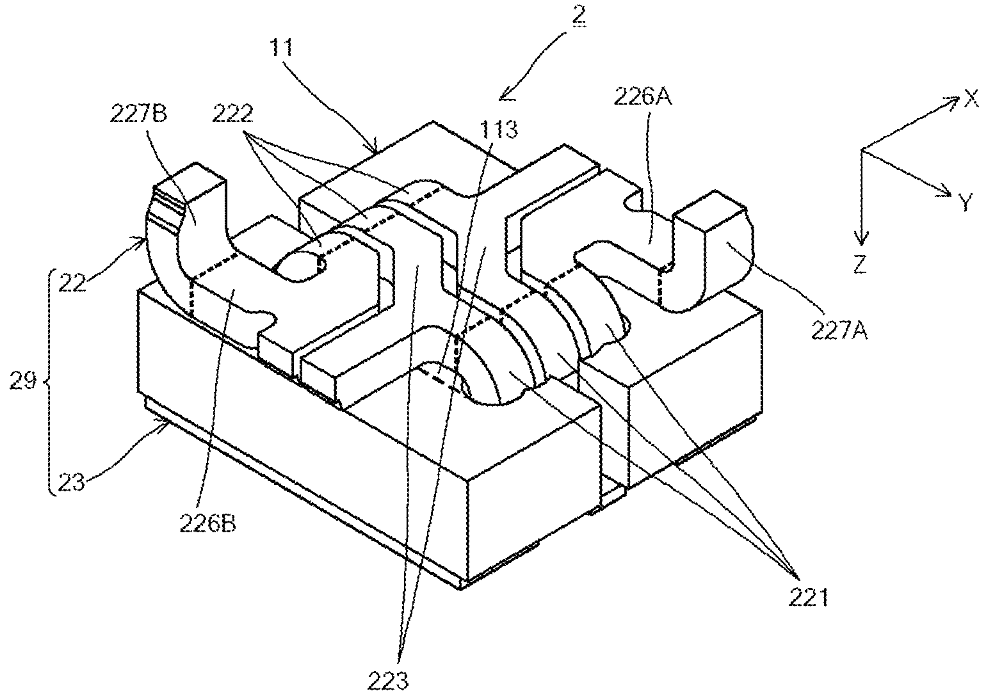
FIG. 6A is a perspective view of an inductor element according to a second preferred embodiment of the present invention.
Figure 6B:
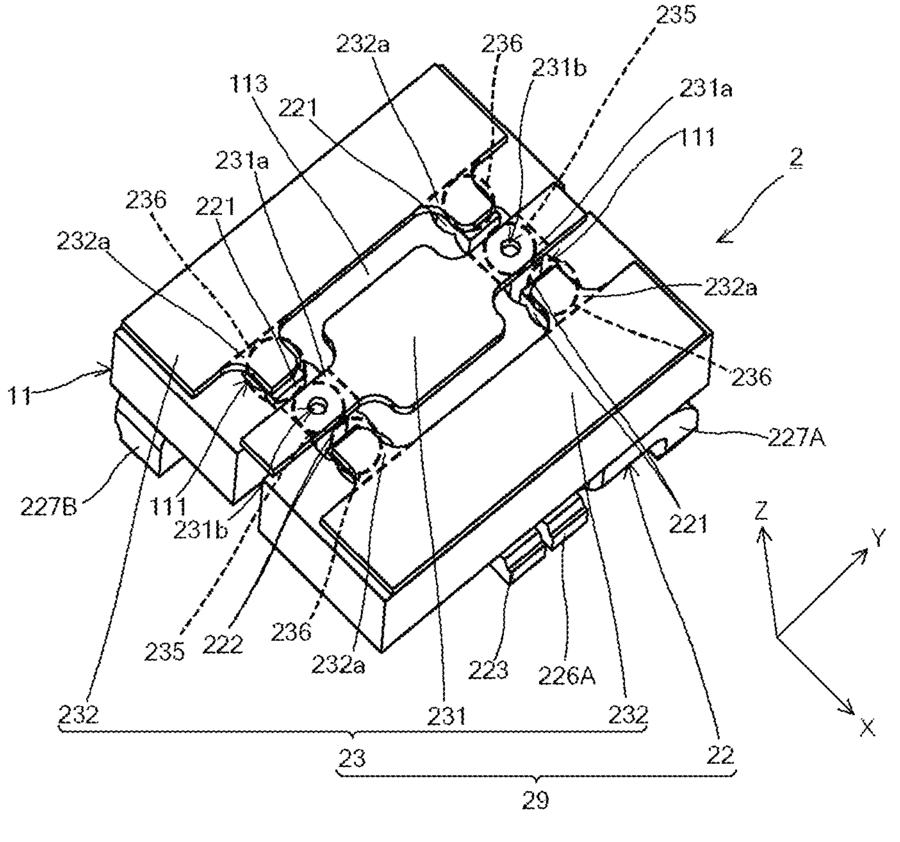
FIG. 6B is a perspective view of the inductor element according to the second preferred embodiment of the present invention.

As shown in FIGS. 6A and 6B, an inductor element 2 according to the second preferred embodiment includes the magnetic body core 11 and a coil 29. Note that in FIGS. 6A and 6B, elements that are the same as or similar to elements of the first preferred embodiment are denoted by the same reference numerals as those in FIG. 1.

Figure 7:
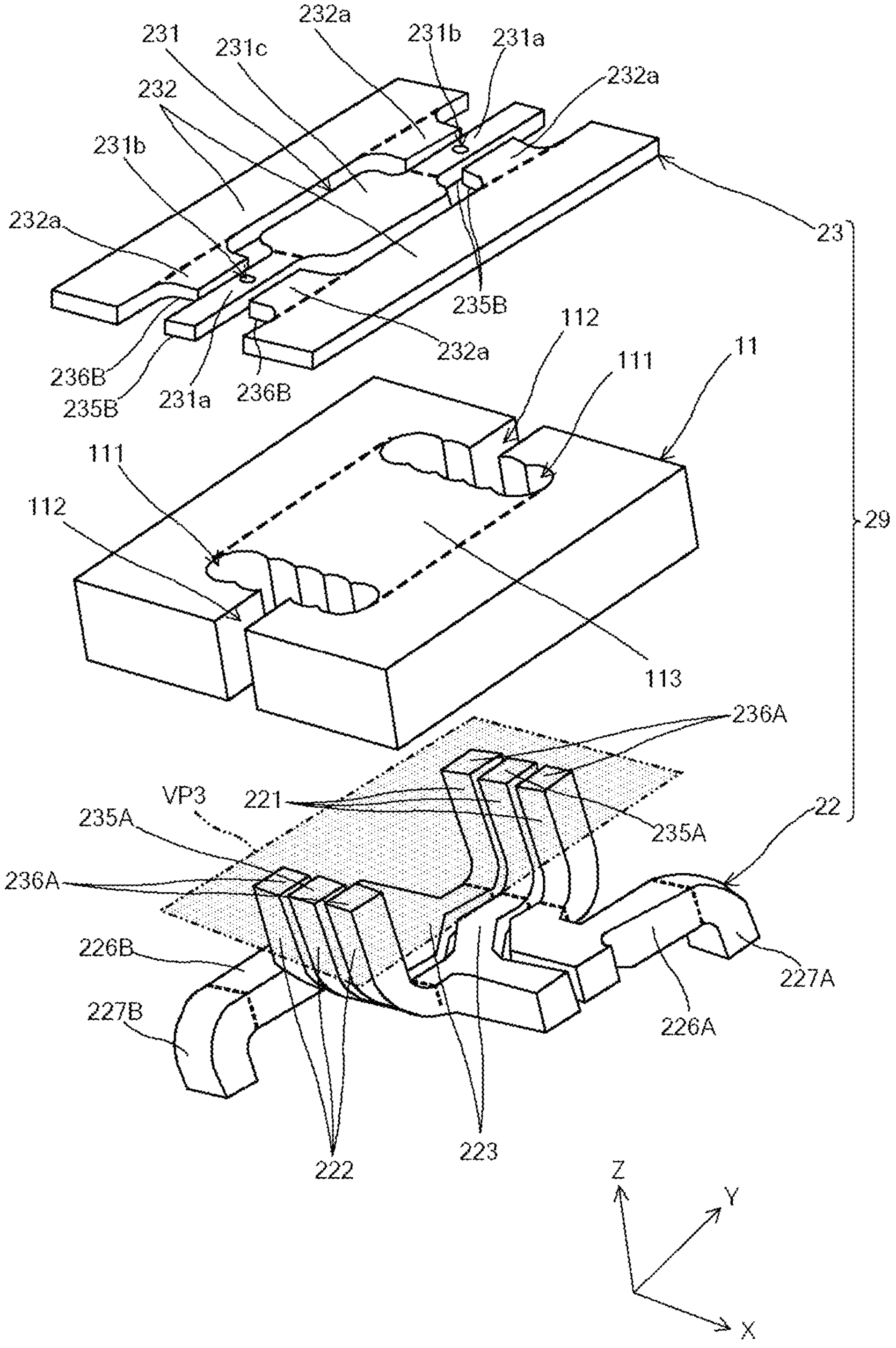
FIG. 7 is an exploded perspective view of the inductor element according to the second preferred embodiment of the present invention.

As shown in FIGS. 6A and 6B, the coil 29 has a long and narrow plate shape, and is wound around the winding portion 113 of the magnetic body core 11 a plurality of times in a state of being inserted through the two through-holes 111 of the magnetic body core 11. Furthermore, as shown in FIG. 6B, the coil 29 includes six bonding portions 235 and 236 that are located only on one side (+Z direction side) in the penetration direction of the through-holes 111 of the magnetic body core 11, that is, in the Z-axis direction. As shown in FIG. 7, the coil 29 includes a first conductive portion 22 and a second conductive portion 23. The first conductive portion 22 includes three first portions 221 each having a long and narrow flat plate shape, three second portions 222 each having a long and narrow flat plate shape, and two fourth portions 223 each having a long and narrow flat plate shape. Furthermore, the second conductive portion 23 includes third portions 231 and 232 each having a long and narrow flat plate shape. Here, of the two through-holes 111 of the magnetic body core 11, one through-hole 111 through which the first portions 221 are inserted corresponds to the first through-hole, and the other through-hole 111 through which the second portions 222 are inserted corresponds to the second through-hole.

The three first portions 221 are arrayed in the X-axis direction (first direction) which is the short-side direction thereof. The three second portions 222 are provided in the same number as that of the three first portions 221, and the longitudinal direction thereof is along the longitudinal direction of the first portions 221, and facing the first portions 221 in the Y-axis direction (second direction) and being arrayed in the X-axis direction. The three first portions 221 and the three second portions 222 are inserted through the through-holes 111 of the magnetic body core 11, respectively, and face each other with the winding portion 113 of the magnetic body core 11 interposed between the three first portions 221 and the three second portions 222. The two fourth portions 223 are provided between the respective other ends of the three first portions 221 on the −Z direction side and the respective other ends, on the −Z direction side, of the second portions 222 adjacent to or in a vicinity of the second portions 222, in the +X direction, that respectively face the three first portions 221 in the Y-axis direction.

Furthermore, the first conductive portion 22 includes two extended portions 226A and 226B, and bent portions 227A and 227B each of which has a shape bent in the −Z direction and which are respectively continuous to the two extended portions 226A and 226B. The extended portion 226A is continuous to an end portion, on the −Z direction side, of the first portion 221 located closest to the +X direction side among the three first portions 221. Furthermore, the extended portion 226B is continuous to an end portion, on the −Z direction side, of the second portion 222 located closest to the −X direction side among the three second portions 222. This first conductive portion 22 including the first portions 221, the second portions 222, and the fourth portions 223 is defined by the same second conductor plate. As the material of the second conductor plate, a metal, for example, such as copper, stainless steel, iron, aluminum, or the like, may preferably be used.

The three third portions 231 and 232 of the second conductive portion 23 are respectively interposed between one ends of the three first portions 221 on the +Z direction side in the longitudinal direction and one ends of the second portions 222, which respectively face the three first portions 221 in the Y-axis direction, on the +Z direction side in the longitudinal direction. The two third portions 232 include tongue piece portions 232*a* that extend in directions approaching each other from both end portions in the longitudinal direction thereof, and are bonded to the first conductive portion 22. Then, the tongue piece portion 232*a* is bonded to the first portion 221 or the second portion 222 in a state where a portion of the first portion 221 or the second portion 222 that does not overlap with the tongue piece portion 232*a* on the extending direction side of the tongue piece portion 232*a* is present when viewed from the Z-axis direction, thereby forming the bonding portion 236. The third portion 231 has a rectangular or substantially rectangular plate-shaped main piece 231*c*, and extending pieces 231*a* each having a rectangular or substantially rectangular plate shape whose width in the X-axis direction is narrower than that of the main piece 231*c* and projecting to both sides of the main piece 231*c* in the longitudinal direction. Furthermore, a through-hole 231*b* having a circular shape in plan view is formed in the extending piece 231*a*. Then, the extending piece 231*a* is bonded to the first portion 221 or the second portion 222 in a state where the tip end portion thereof projects to the extending direction side of the extending piece 231*a* relative to the first portion 221 or the second portion 222 when viewed from the Z-axis direction, thereby forming the bonding portion 235. This second conductive portion 23 including the third portions 231 and 232 is formed of the same third conductor plate that is different from the second conductor plate. As the material of the third conductor plate, a metal, for example, copper, stainless steel, iron, aluminum, or the like, may preferably be used. In addition, in order to add an insulation property to these materials, resin coating or nickel plating may be applied thereto.

Next, a manufacturing method for the inductor element 2 according to the second preferred embodiment will be described with reference to FIG. 8 to FIG. 10. First, a second base material forming step of forming a second base material including two eighth portions, three ninth portions, three tenth portions, and two frame bodies is performed. Here, each of the two eighth portions has a plate shape bending in the X-axis direction at the center portion in the longitudinal direction, and is a portion defining and functioning as a base of the fourth portion 223. Furthermore, each of the three ninth portions has a long and narrow rectangular or substantially rectangular plate shape, and is a portion defining and functioning as a base of the first portion 221. Each of the three tenth portions has a long and narrow rectangular or substantially rectangular plate shape, and is a portion defining and functioning as a base of the second portion 222.

Next, a third bending step of bending the three ninth portions and the three tenth portions in the third direction along the thickness direction of the eighth portion is performed. With this, as shown in FIG. 8, a second base material 1022 including two eighth portions 1223, three ninth portions 1221, three tenth portions 1222, and two frame bodies 1022A and 1022B is formed. Note that the second base material 1022 includes the extended portions 226A and 226B, and the bent portions 227A and 227B. The extended portion 226A and one of the two eighth portions 1223 are continuous to the frame body 1022A having a square shape with one side open in plan view, and the extended portion 226B and the other of the two eighth portions are continuous to the frame body 1022B having a square shape with one side open in plan view. Note that in FIG. 8, only a portion corresponding to one inductor element 2 in the second base material 1022 is shown. The second base material 1022 has portions corresponding to a plurality of inductor elements 2 connected in a matrix shape with the frame bodies 1022A and 1022B interposed between portions corresponding to the plurality of inductor elements 2.

Here, the three ninth portions 1221 and the three tenth portions 1222 are bent in the +Z direction which is the third direction along the thickness direction of the eighth portion 1223. Furthermore, respective first bonding surfaces 235A, 236A at the tip end portions of the three ninth portions 1221 and respective first bonding surfaces 235A, 236A at the tip end portions of the three tenth portions 1222 are located on the same first virtual plane VP1 that partially intersects with the three ninth portions 1221 and the three tenth portions 1222. Here, the expression "respective first bonding surfaces 235A, 236A at the tip end portions of the three ninth portions 1221 and respective first bonding surfaces 235A, 236A at the tip end portions of the three tenth portions 1222 are located on the same first virtual plane VP1 that partially intersects with the three ninth portions 1221 and the three tenth portions 1222" also includes, similar to the first preferred embodiment, a case where the surfaces are located in the region S1 between the first virtual plane VP1 and the same second virtual plane VP2 that is present at the position separated by the reference distance Δf from the first virtual plane VP1. The first bonding surfaces 235A and 236A are each located in the same third virtual plane VP3 that is parallel or substantially parallel to the first virtual plane VP1 and the second virtual plane VP2 and is located between the first virtual plane VP1 and the second virtual plane VP2.

Furthermore, in parallel or substantially in parallel with the second base material forming step described above, as shown in FIG. 9, a third base material forming step of forming a third base material 1023 having long and narrow eleventh portions 1231 and 1232 that respectively define and function as bases of the third portions 231 and 232 is performed. Here, for example, the third base material 1023 is formed by performing punching processing on the third conductor plate. The eleventh portion 1231 includes a portion 1231*c* defining and functioning as a base of the main piece 231*c* and portions 1231*a* respectively defining and functioning as bases of the extending pieces 231*a*. Furthermore, in the third base material forming step, the through-holes 231*b* penetrating through the eleventh portion 1231 in the thickness direction are provided on both end portions of the eleventh portion 1231, respectively. Note that in FIG. 9, only a portion corresponding to one inductor element 2 in the third base material 1023 is shown. The third base material 1023 includes portions corresponding to a plurality of inductor elements 2 connected in a matrix shape by being connected to a plurality of bars (not shown) provided in parallel or substantially in parallel to one another with both end portions of each of the eleventh portions 1231 and 1232 in the longitudinal direction interposed between the portions corresponding to the plurality of inductor elements 2.

Figure 8:
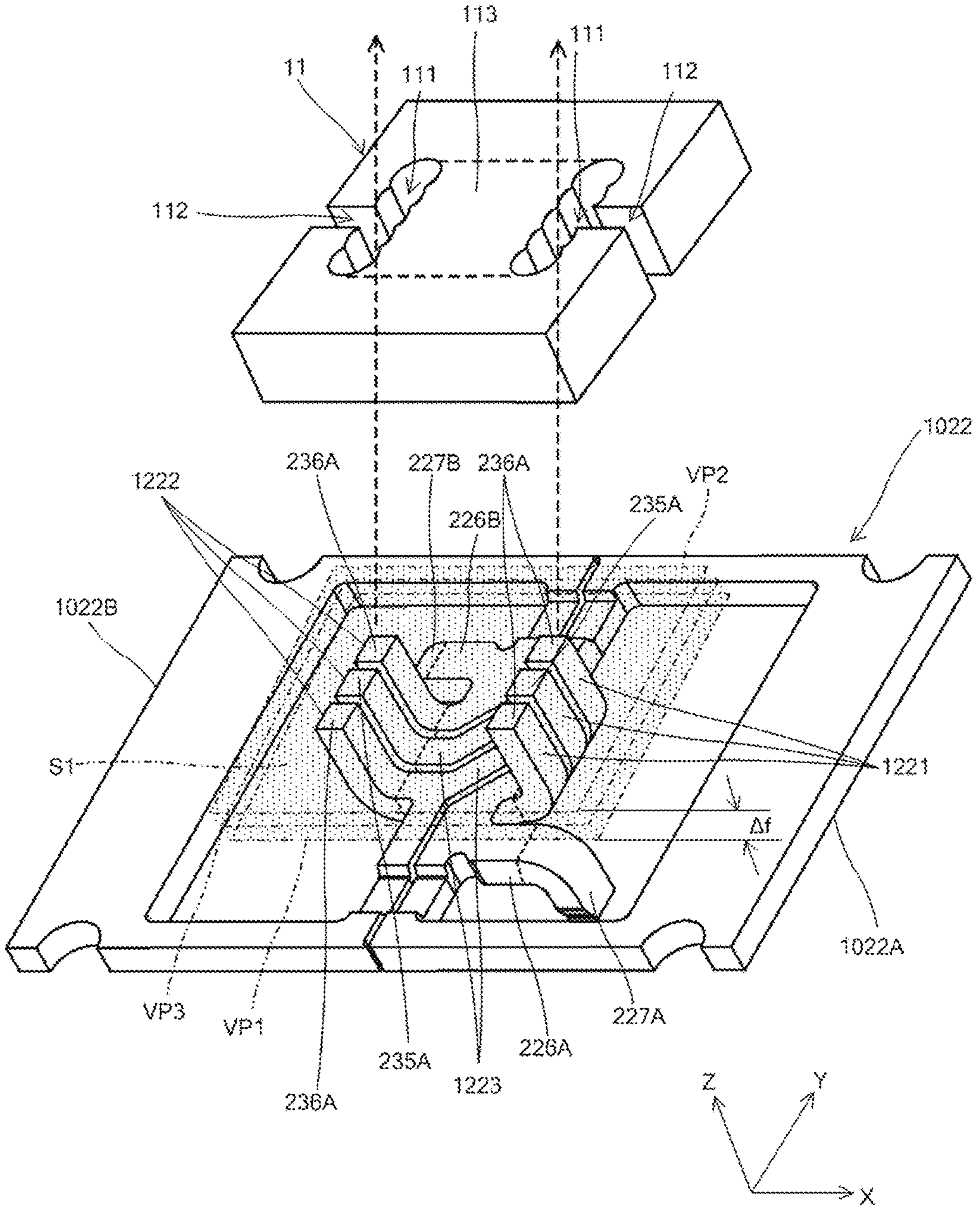
FIG. 8 is an exploded perspective view of a second base material and a magnetic body core according to the second preferred embodiment of the present invention.

Subsequently, as shown in FIG. 8, an inserting step of inserting the three ninth portions 1221 and the three tenth portions 1222 through the two through-holes 111 of the magnetic body core 11, respectively, is performed (see broken lines in FIG. 8).

Figure 9:
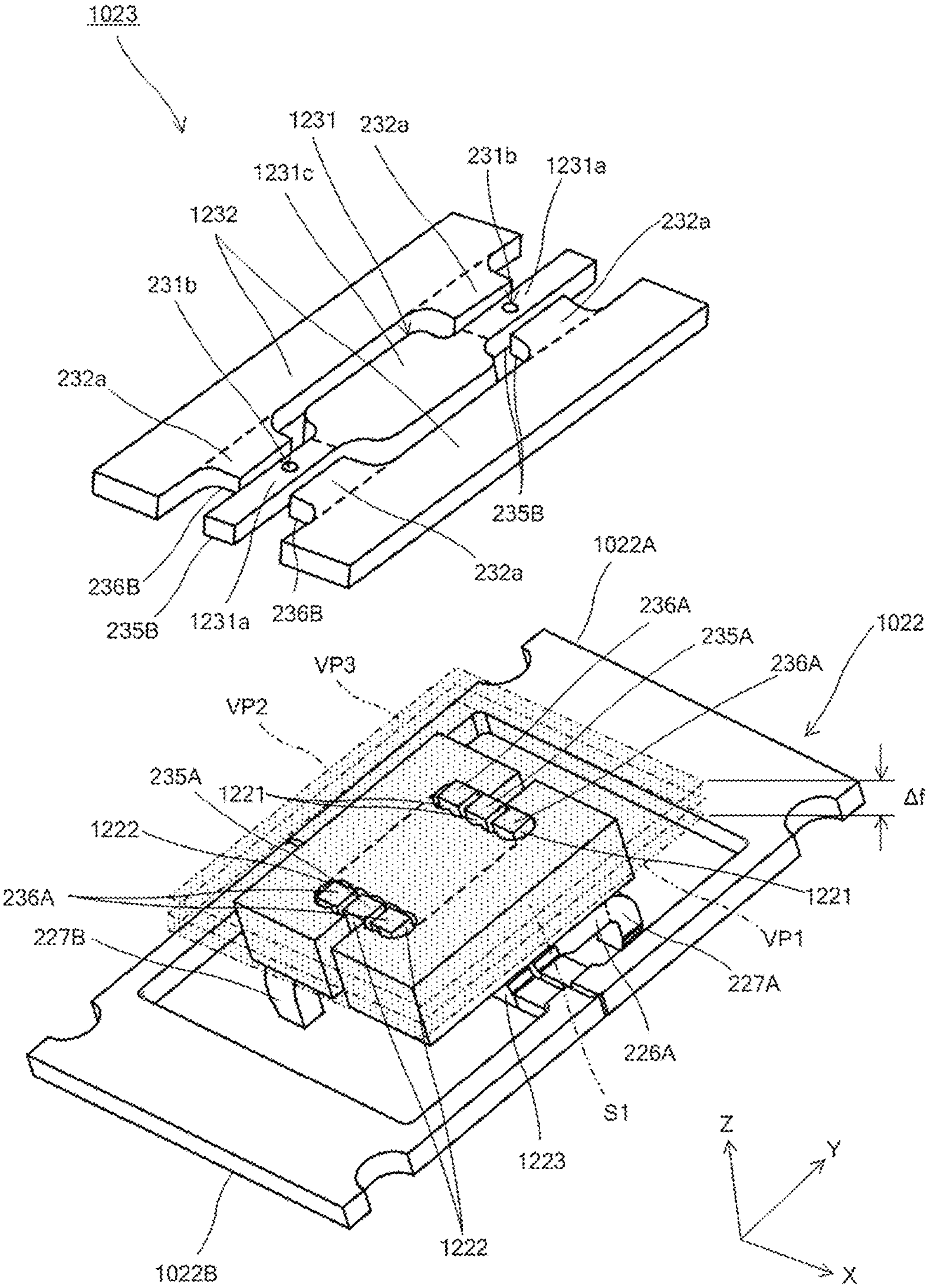
FIG. 9 is an exploded perspective view of the second base material, the magnetic body core, and a third base material according to the second preferred embodiment of the present invention.

Thereafter, as shown in FIG. 9, a contact step of bringing the eleventh portions 1231 and 1232 of the third base material 1023 into contact with the tip end portions of the ninth portions 1221 and the tip end portions of the tenth portions 1222 of the second base material 1022, respectively, is performed. Here, a state in which the first bonding surfaces 235A of the end portions of the ninth portion 1221 and the tenth portion 1222 shown in FIG. 9 and second bonding surfaces 235B of the extending pieces 1231*a* of the eleventh portion 1231 on the −Z direction side are respectively in surface contact with each other is provided. Furthermore, a state in which the first bonding surfaces 236A of the end portions of the ninth portions 1221 and the tenth portions 1222 and second bonding surfaces 236B of the tongue piece portions 1232*a* of the respective eleventh portions 1232 on the −Z direction side are respectively in surface contact with each other is provided.

Figure 10:
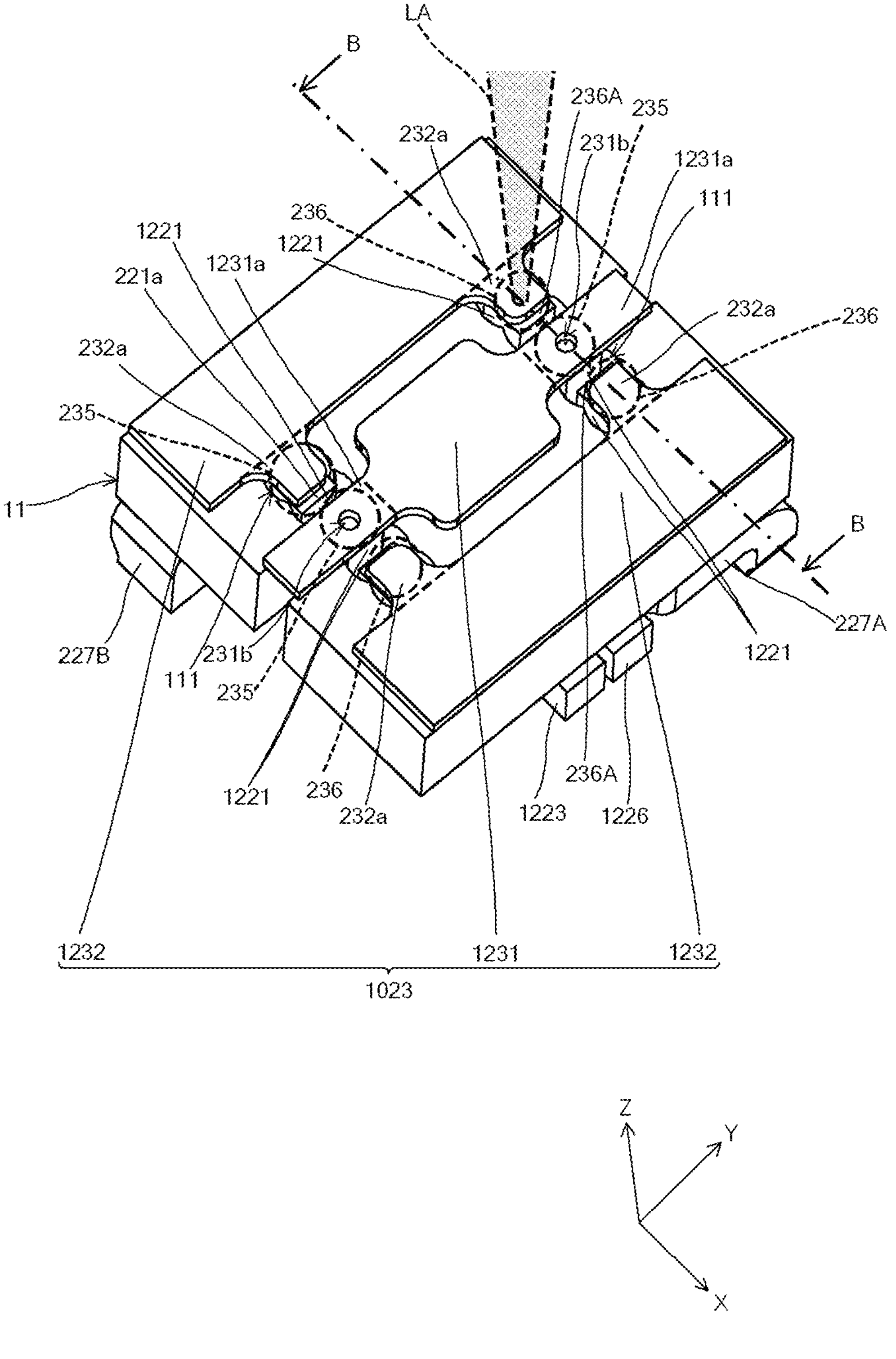
FIG. 10 is a perspective view showing a welding step according to the second preferred embodiment of the present invention.
Figure 11:
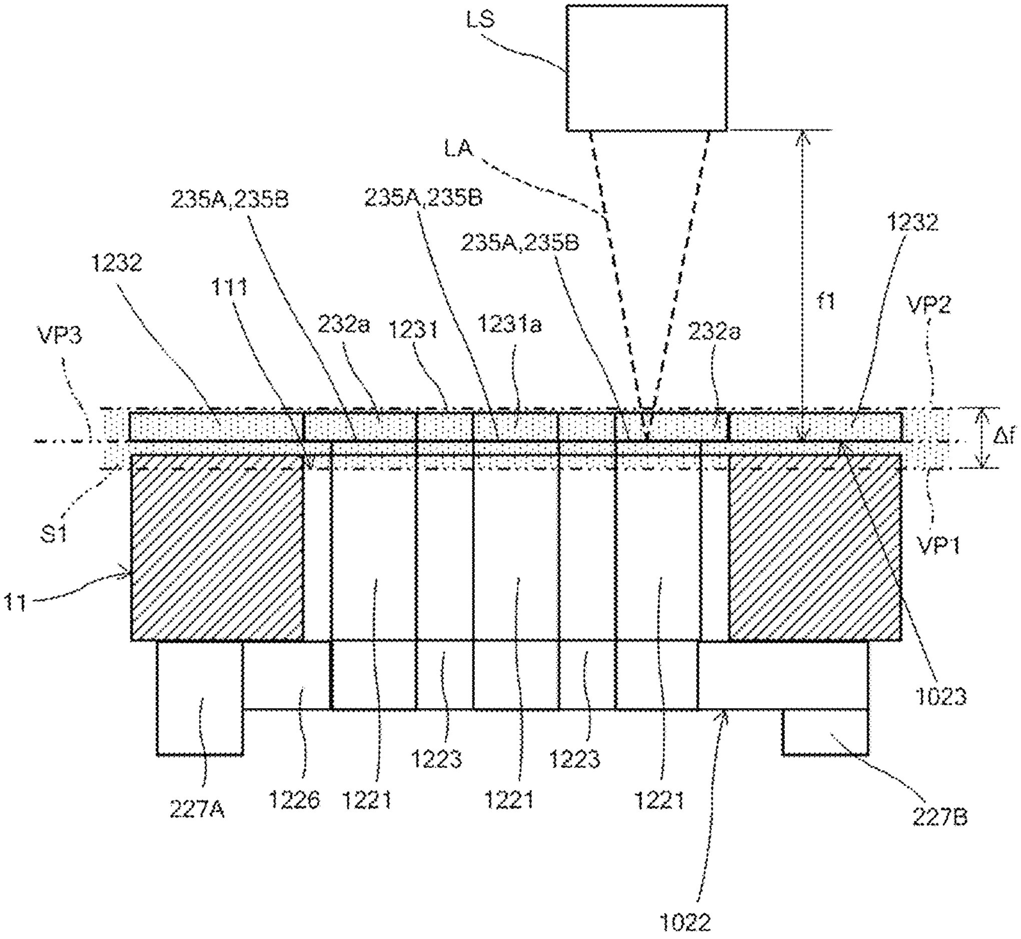
FIG. 11 is partial cross-sectional view showing the welding step according to the second preferred embodiment of the present invention, taken along a line B-B in FIG. 10 when viewed in an arrow direction.

Next, as shown in FIG. 10 and FIG. 11, in a state in which the eleventh portions 1231 and 1232 are brought into contact with the tip end portions of the ninth portions 1221 and the tip end portions of the tenth portions 1222 of the second base material 1022, respectively, the extending pieces 1231*a* of the eleventh portion 1231 and the tongue piece portions 1232*a* of the eleventh portions 1232 are irradiated with the laser beams LA, respectively. Note that in FIG. 10 and FIG. 11, the frame bodies 1022A and 1022B are not shown. As a result, the eleventh portions 1231 and 1232, and the tip end portions of the ninth portions 1221 and the tip end portions of the tenth portions 1222 are respectively welded to each other. As described above, a composite structural body in which a plurality of magnetic body cores 11 is assembled to the one second base material 1022 and the one third base material 1023 is formed.

Subsequently, by separating the extended portion 226A and one of the two eighth portions 1223 from the frame body 1022A, and separating the extended portion 226B and the other of the two eighth portions from the frame body 1022B, the above-described composite structural body is divided into element pieces respectively corresponding to the plurality of inductor elements 2. Then, by bending portions 1227 of each of the element pieces, the bent portions 227A and 227B are formed. With this, the inductor element 2 is completed.

As described above, according to the inductor element 2 according to the second preferred embodiment, the coil 29 includes the six bonding portions 235 and 236 that are located only on the +Z direction side of the magnetic body core 11. Accordingly, for example, the number of bonding portions in the coil 29 as a whole is reduced as compared with a coil having a plurality of bonding portions on both respective sides in the Z-axis direction of the magnetic body core 11. Accordingly, since the resistance value of the coil 29 is able to be reduced by an amount corresponding to reduction in the number of bonding portions 235 and 236 each having a higher resistance value than the portion other than the bonding portions 235 and 236 of the coil 29, energy loss in the inductor element 2 is reduced. Furthermore, by locating the six bonding portions 235 and 236 only on the +Z direction side of the magnetic body core 11, since a step of turning the magnetic body core 11 over is unnecessary in manufacturing steps of the inductor element 2, simplification of the manufacturing steps by reducing the number of steps is achieved. Furthermore, according to the inductor element 2 according to the second preferred embodiment, the six bonding portions 235 and 236 are located on the same first virtual plane VP1 that partially intersects with the first conductive portion 22 of the coil 29. Accordingly, since the frequency of focus adjustment of the laser beam LA is able to be significantly reduced, the above-described welding step is able to be simplified by an amount corresponding thereto, and thus simplification of the manufacturing steps of the inductor element 2 is provided.

Furthermore, the first portions 221, the second portions 222, and the fourth portions 223 according to the second preferred embodiment are defined by the same second conductor plate, and third portions 231, 232 are defined by the third conductor plate different from the second conductor plate. Accordingly, the thickness or the shape of each of the second conductor plate and the third conductor plate is able to be easily changed, and the characteristics of the inductor element 2 are able to be easily adjusted. Furthermore, since the size of the inductor element 2 is also easily adjusted, there is also an advantage that reduction in height of the inductor element 2 is easily provided.

Furthermore, in the extending piece 231*a*, which is a bonding portion to be bonded to the first conductive portion 22, of the third portion 231 according to the second preferred embodiment, the through-hole 231*b* having a circular shape in plan view is formed. Accordingly, in the welding step, accuracy of the irradiation position when radiating the laser beam LA is able to be significantly improved. Furthermore, the bonding state between the second bonding surface 235B of the third portion 231 and the first bonding surface 235A of the first portion 221 or the second portion 222 through the through-hole 231*b* is able to be visually determined, and thus the occurrence of a bonding defect between the third portion 231 and the first portion 221 or the second portion 222 is able to be significantly reduced or prevented.

Third Preferred Embodiment

In an inductor element according to a third present preferred embodiment of the present invention, a coil includes a plurality of first conductor pieces arrayed in one direction on one side in the penetration direction of a through-hole of the magnetic body core, and a plurality of second conductor pieces provided on the other side in the penetration direction of the through-hole of the magnetic body core. The plurality of second conductor pieces overlap with two adjacent first conductor pieces, and protruding portions are provided in respective portions overlapping with the two first conductor pieces. Additionally, respective tip end portions of the plurality of protruding portions are bonded to the first conductor pieces.

Figure 12:
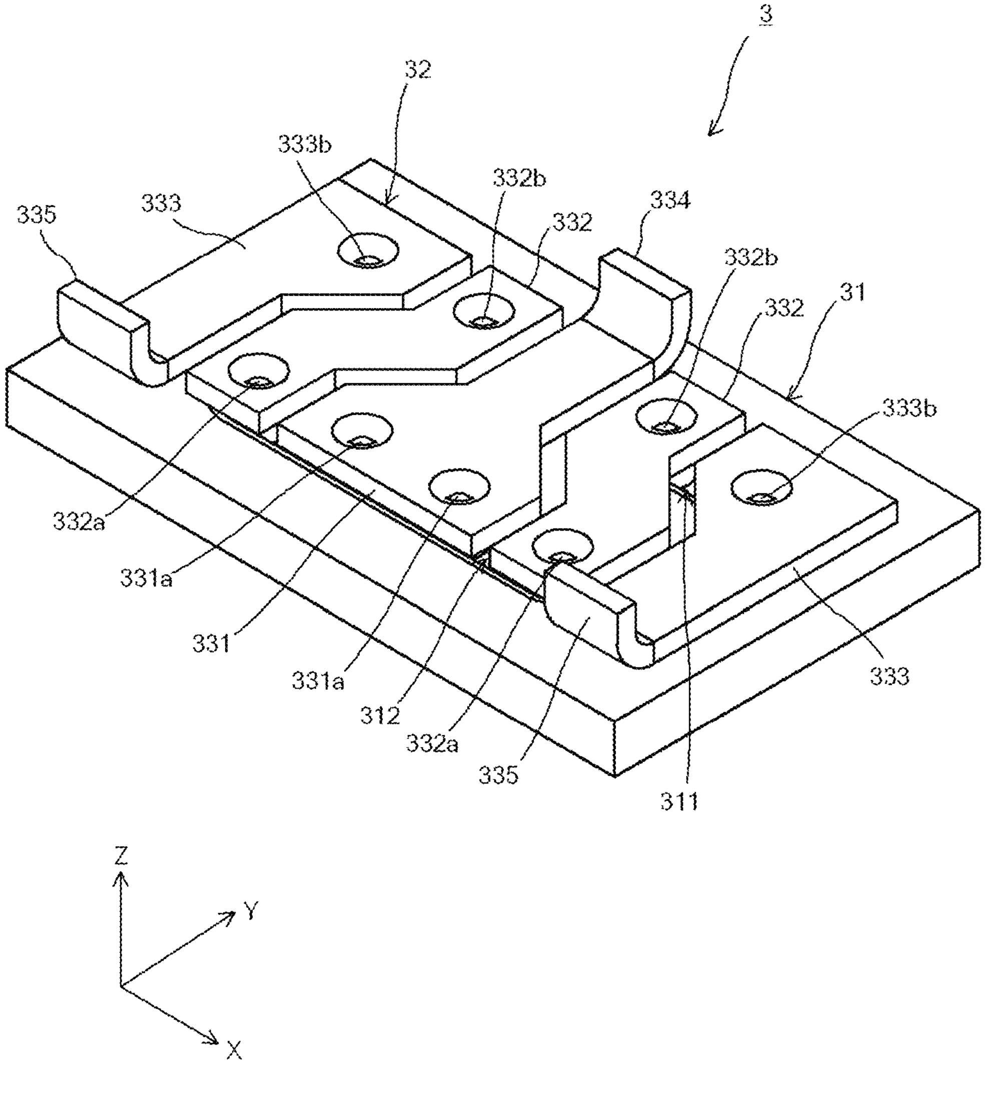
FIG. 12 is a perspective view of an inductor element according to a third preferred embodiment of the present invention.
Figure 13A:
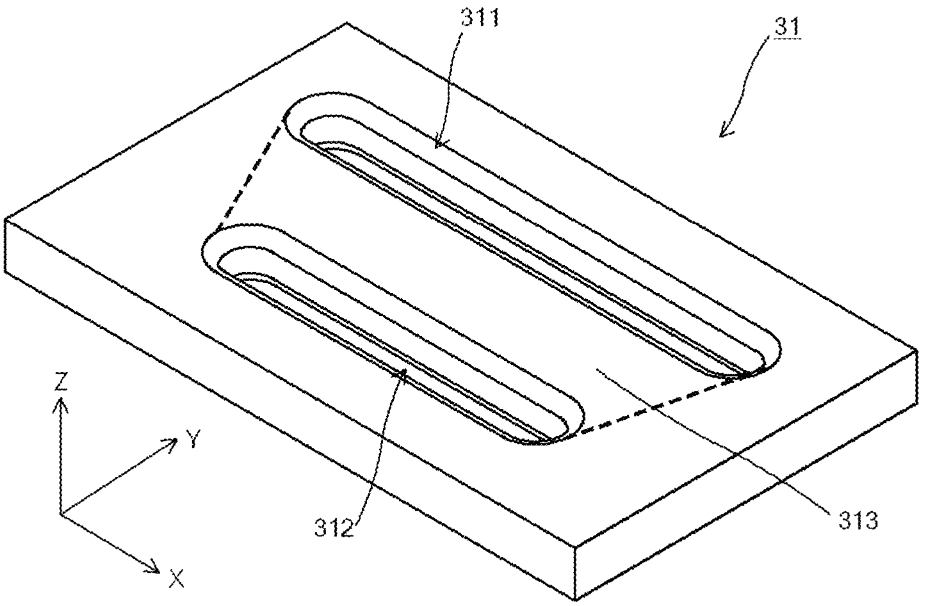
FIG. 13A is a perspective view of a magnetic body core according to the third preferred embodiment of the present invention.

As shown in FIG. 12, an inductor element 3 according to the third preferred embodiment includes a magnetic body core 31 and a coil 32. As shown in FIG. 13A, the magnetic body core 31 has a rectangular or substantially flat substantially rectangular parallelepiped shape, and is provided with two through-holes 311 and 312 penetrating therethrough in the thickness direction thereof. Each of the through-holes 311 and 312 has a long and narrow shape in plan view, and is provided such that the longitudinal direction thereof is along the X-axis direction. In addition, in the X-axis direction, the length of the through-hole 311 is longer than the length of the through-hole 312. The two through-holes 311 and 312 are respectively located at two places separated from each other in the Y-axis direction. A portion between the two through-holes 311 and 312 and adjacent to or in a vicinity of the through-holes 311 and 312 in the Y-axis direction of the magnetic body core 31 corresponds to a winding portion 313 around which the coil 32 is wound. Furthermore, the material of the magnetic body core 31 is the same as or similar to elements of the magnetic body core 11 described in the first preferred embodiment. Here, the through-holes 311 and 312 of the magnetic body core 31 correspond to the first through-hole and the second through-hole, respectively.

Figure 13B:
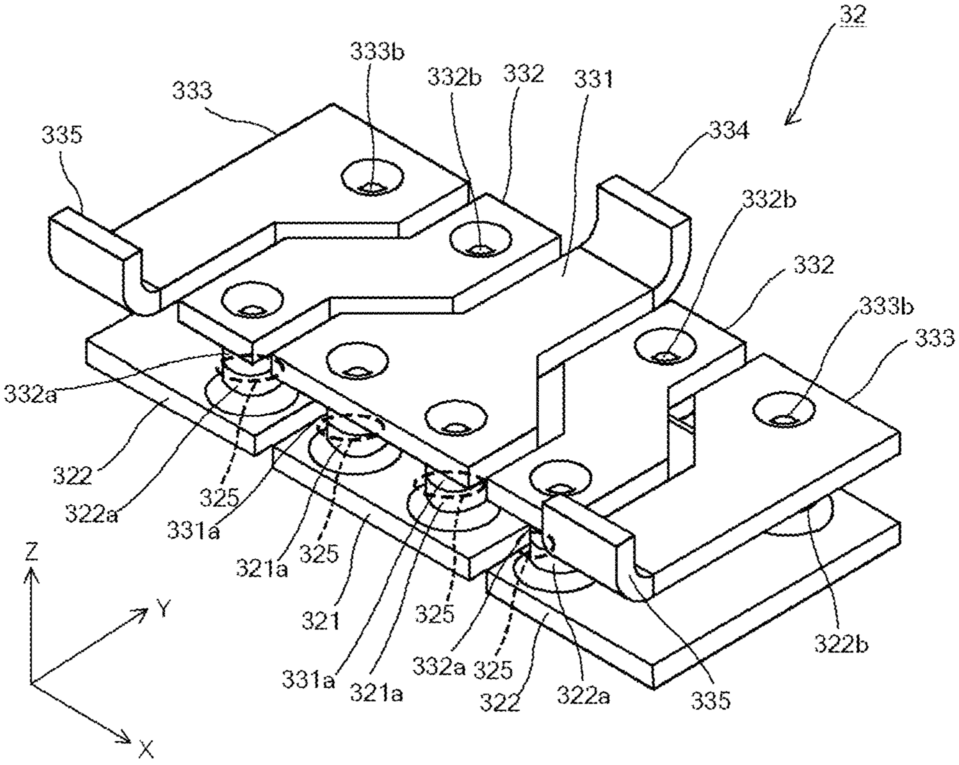
FIG. 13B is a perspective view of a coil according to the third preferred embodiment of the present invention.

As shown in FIG. 13B, the coil 32 includes five first conductor pieces 331, 332, and 333, and three second conductor pieces 321 and 322. As shown in FIG. 12, the five first conductor pieces 331, 332, and 333 are arrayed along the Z-axis direction (third direction) on one side in the penetration direction of the through-holes 311 and 312 of the magnetic body core 31, that is, on the +Z direction side. Furthermore, as shown in FIG. 13B and FIGS. 14A to 14C, the five first conductor pieces 331, 332, and 333 are provided with protruding portions 331*a*, 332*a*, 332*b*, and 333*b* that protrude toward the second conductor pieces 321 and 322 side. Recessed portions are respectively provided at portions of the first conductor pieces 331, 332, and 333 corresponding to the respective protruding portions 331*a*, 332*a*, 332*b*, and 333*b* on the opposite side to the second conductor pieces 321 and 322 side. Additionally, bottom portions of the recessed portions correspond to tip end portions of the protruding portions 331*a*, 332*a*, 332*b*, and 333*b*, respectively.

As shown in FIG. 13B and FIGS. 14A to 14C, the three second conductor pieces 321 and 322 are provided on the −Z direction side along the X-axis direction so as to overlap with two pieces of the first conductor pieces 331, 332, and 333 adjacent to each other in the X-axis direction when viewed from the Z-axis direction. Protruding portions 321*a*, 321*b*, 322*a*, and 322*b* that protrude toward the first conductor pieces 331, 332, and 333 side are respectively provided at portions of the three second conductor pieces 321 and 322 overlapping with the two pieces of the first conductor pieces 331, 332, and 333 adjacent to each other. Recessed portions are respectively provided at portions of the second conductor pieces 321 and 322 corresponding to the respective protruding portions 321*a*, 321*b*, 322*a*, and 322*b* on the opposite side to the first conductor pieces 331, 332, and 333 side. Additionally, bottom portions of the respective recessed portions correspond to tip end portions of the protruding portions 321*a*, 321*b*, 322*a*, and 322*b*, respectively. The tip end portions of the two protruding portions 321*a* of the second conductor piece 321 are respectively bonded to tip end portions of the two protruding portions 331*a* of the first conductor piece 331. The two protruding portions 321*b* of the second conductor piece 321 are respectively bonded to tip end portions of the protruding portions 332*b* of the first conductor pieces 332 overlapping therewith in the Z-axis direction. The respective protruding portions 322*a* of the two second conductor pieces 322 are respectively bonded to tip end portions of the protruding portions 332*a* of the first conductor pieces 332 overlapping therewith in the Z-axis direction. The respective protruding portions 322*b* of the two second conductor pieces 322 are respectively bonded to tip end portions of the protruding portions 333*b* of the first conductor pieces 333 overlapping therewith in the Z-axis direction. As described above, eight bonding portions 325 are provided between the protruding portions

331*a*, 332*a*, 332*b*, and 333*b* of the first conductor pieces 331, 332, and 333 and the protruding portions 321*a*, 321*b*, 322*a*, and 322*b* of the second conductor pieces 321 and 322.

Additionally, the eight bonding portions 325 face the +Z direction side of the magnetic body core 31 with the recessed portions respectively provided at the portions corresponding to the protruding portions 331*a*, 332*a*, 332*b*, and 333*b* of the first conductor pieces 331, 332, and 333 respectively interposed between the eight bonding portions 325. Furthermore, the eight bonding portions 325 face the −Z direction side of the magnetic body core 31 with the recessed portions respectively provided at the portions corresponding to the protruding portions 321*a*, 321*b*, 322*a*, and 322*b* of the second conductor pieces 321 and 322 respectively interposed between the eight bonding portions 325. Note that as the material of the first conductor pieces 331, 332, and 333 and the second conductor pieces 321 and 322, a metal, for example, such as copper, stainless steel, iron, aluminum, or the like, may preferably be used.

Figure 15A:
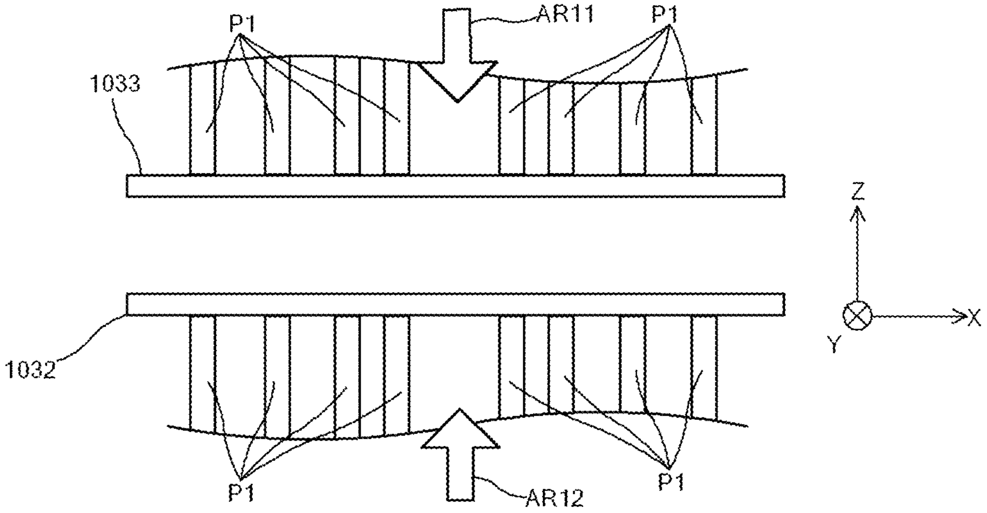
FIG. 15A is a side view showing a state before crimping processing in a crimping step according to the third preferred embodiment of the present invention.
Figure 15B:
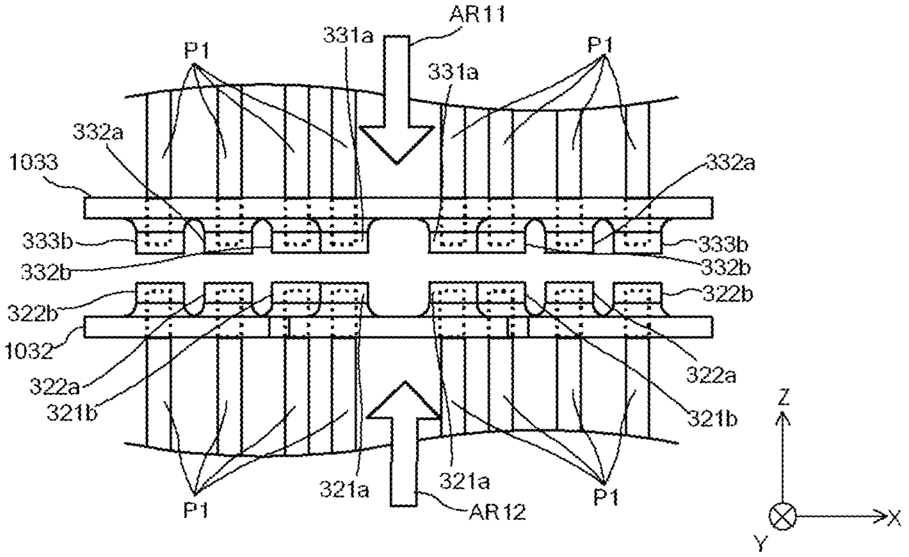
FIG. 15B is a side view showing a state after crimping processing in the crimping step according to the third preferred embodiment of the present invention.
Figure 16A:
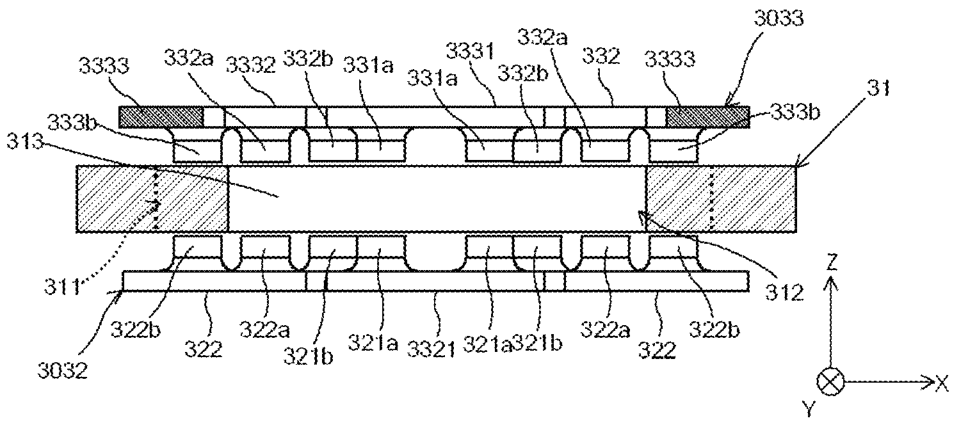
FIG. 16A is a partial cross-sectional view showing a state before protruding portions are inserted through a through-hole in an insertion step according to the third preferred embodiment of the present invention.

Next, a manufacturing method for the inductor element 3 according to the third preferred embodiment will be described with reference to FIG. 15A to FIG. 16C. First, as shown in FIG. 15A, a drawing processing is performed in which a plurality of pins P1 is pressed against a fourth conductor plate 1033 (see an arrow AR11 in FIG. 15A). As a result, as shown in FIG. 15B, the plurality of protruding portions 331*a*, 332*a*, 332*b*, and 333*b* are formed on the fourth conductor plate 1033. Then, by applying punching processing on the fourth conductor plate 1033, for example, as shown in FIG. 16A, a fourth base material 3033 defining and functioning as a base of the plurality of first conductor pieces 331, 332, and 333 is formed. As described above, by performing a fourth base material forming step of performing the drawing processing and the punching processing on the fourth conductor plate 1033, the fourth base material 3033 is formed.

Furthermore, as shown in FIG. 15A, a drawing processing is performed in parallel or substantially in parallel in which a plurality of pins P1 is pressed against a fifth conductor plate 1032 (see an arrow AR12 in FIG. 15A). As a result, as shown in FIG. 15B, the plurality of protruding portions 321*a*, 321*b*, 322*a*, and 322*b* are formed on the fifth conductor plate 1032. Then, by applying punching processing on the fifth conductor plate 1032, for example, as shown in FIG. 16A, a fifth base material 3032 defining and functioning as a base of the plurality of second conductor pieces 321 and 322 is formed. As described above, by performing a fifth base material forming step of performing the drawing processing and the punching processing on the fifth conductor plate 1032, the fifth base material 3032 is formed.

Figure 14A:
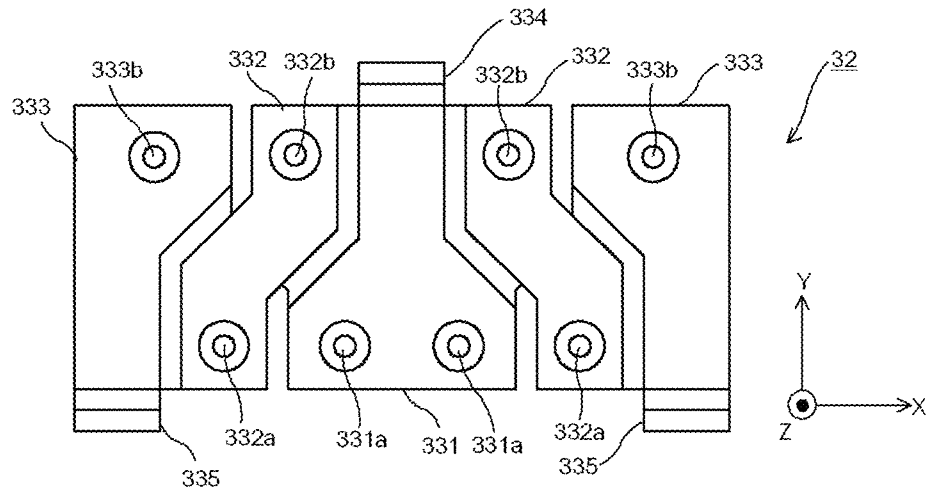
FIG. 14A is a plan view of the coil according to the third preferred embodiment of the present invention.
Figure 14B:
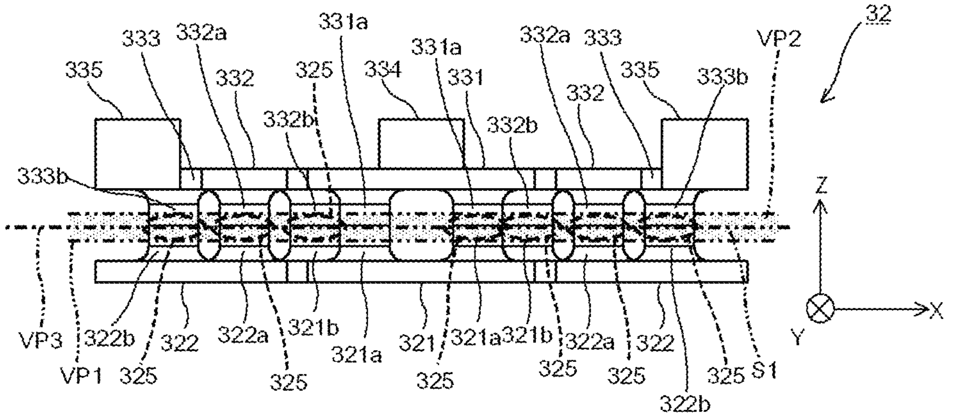
FIG. 14B is a side view of the coil according to the third preferred embodiment of the present invention.
Figure 14C:
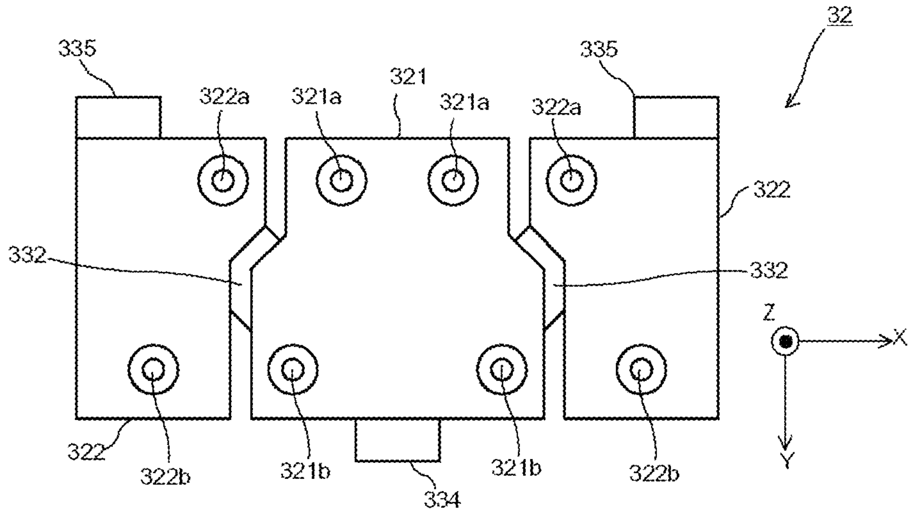
FIG. 14C is a bottom view of the coil according to the third preferred embodiment of the present invention.

Here, as shown in FIG. 14B, the tip end portions of the plurality of protruding portions 331*a*, 332*a*, 332*b*, and 333*b* of the fourth base material 3033 are located on the same first virtual plane VP1 that partially intersects with the plurality of protruding portions 331*a*, 332*a*, 332*b*, and 333*b*. Here, the expression "the tip end portions of the plurality of protruding portions 331*a*, 332*a*, 332*b*, and 333*b* are located on the first virtual plane VP1 that partially intersects with the plurality of protruding portions 331*a*, 332*a*, 332*b*, and 333*b*" also includes a case where they are located in the region S1 between the first virtual plane VP1 and the second virtual plane VP2. Here, the second virtual plane VP2 is parallel or substantially parallel to the first virtual plane VP1, and is present at a position separated by the predetermined reference distance Δf from the first virtual plane VP1. Furthermore, the tip end portions of the plurality of protruding portions 321*a*, 321*b*, 322*a*, and 332*b* of the fifth base material 3032 are also located in the region S1 between the first virtual plane VP1 that partially intersects with the plurality of protruding portions 321*a*, 321*b*, 322*a*, and 322*b* and the second virtual plane VP2. Here, the reference distance Δf is set, when the focal point of the laser beam LA applied during generating the tip end portions of the protruding portions 331*a*, 332*a*, 332*b*, and 333*b* and the protruding portions 321*a*, 321*b*, 322*a*, and 332*b* by a laser welding technique is located between the first virtual plane VP1 and the second virtual plane VP2, to include the entire region in which energy density of the laser beam LA is equal or substantially equal to or greater than an energy density threshold at which the tip end portions of the protruding portions 331*a*, 332*a*, 332*b*, 333*b*, 321*a*, 321*b*, 322*a*, and 322*b* is able to be dissolved. The reference distance Δf is set, for example, to be equal substantially equal to the focal depth of the laser beam LA.

Next, as shown in FIG. 16A, the magnetic body core 31 is provided between the fourth base material 3033 and the fifth base material 3032. Subsequently, an inserting step of inserting the plurality of protruding portions 331*a*, 332*a*, 332*b*, and 333*b* of the fourth base material 3033 and the plurality of protruding portions 321*a*, 321*b*, 322*a*, and 332*b* of the fifth base material 3032 through the through-holes 311 and 312 is performed.

Figure 16B:
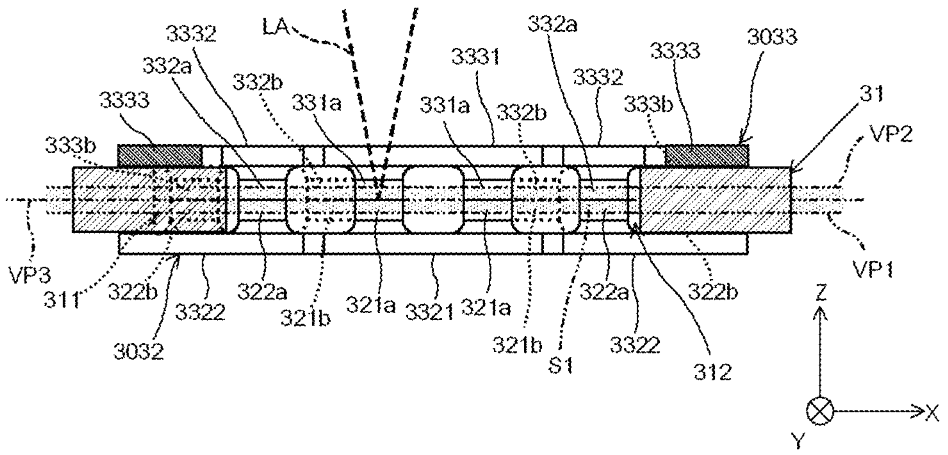
FIG. 16B is a partial cross-sectional view showing a state in which the protruding portions are brought into contact with each other in the insertion step according to the third preferred embodiment of the present invention.

Then, as shown in FIG. 16B, a contact step of bringing the tip end portions of the plurality of protruding portions 321*a*, 321*b*, 322*a*, and 332*b* of the fifth base material 3032 into contact with the plurality of protruding portions 331*a*, 332*a*, 332*b*, and 333*b* of the fourth base material 3033, respectively, is performed.

Thereafter, in a state in which the tip end portions of the plurality of protruding portions 321*a*, 321*b*, 322*a*, and 332*b* are brought into contact with the plurality of protruding portions 331*a*, 332*a*, 332*b*, and 333*b*, respectively, a welding step of irradiating the respective tip end portions of the plurality of protruding portions 321*a*, 321*b*, 322*a*, and 332*b* with laser beams is performed. With this, the tip end portions of the plurality of protruding portions 321*a*, 321*b*, 322*a*, and 332*b* of the fifth base material 3032 and the plurality of protruding portions 331*a*, 332*a*, 332*b*, and 333*b* of the fourth base material 3033 are respectively welded to each other. As described above, a composite structural body in which a plurality of magnetic body cores 31 is assembled to the one fourth base material 3033 and the one fifth base material 3032 is formed.

Figure 16C:
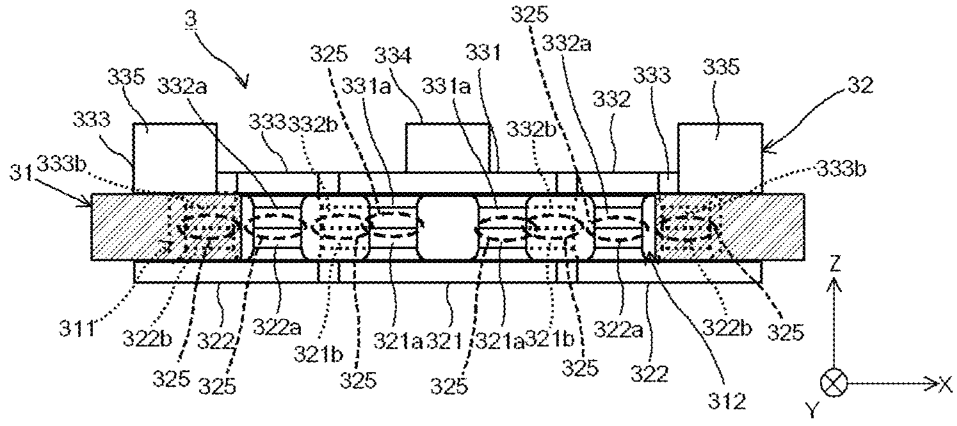
FIG. 16C is a partial cross-sectional view showing a state in which the inductor element is completed through a bending step after division into element pieces in the third preferred embodiment of the present invention.

Subsequently, as shown in FIG. 16C, the above-described composite structural body is divided into element pieces respectively corresponding to the plurality of inductor elements 3. Then, by bending portions 3331 and 3333 of each of the element pieces, bent portions 334 and 335 are formed. With this, the inductor element 3 is completed.

As described above, according to the inductor element 3 according to the third preferred embodiment, the eight bonding portions 325 of the coil 32 each face the +Z direction side and the −Z direction side of the magnetic body core 31. Accordingly, since a step of turning the magnetic body core 31 over is unnecessary in manufacturing steps of the inductor element 3, simplification of the manufacturing steps by reducing the number of steps is provided. Furthermore, the eight bonding portions 325 are located on the same first virtual plane VP1 that partially intersects with the coil 32. Accordingly, when the eight bonding portions 325 are generated, since the frequency of focus adjustment of the laser beam LA is able to be significantly reduced, the step of generating the eight bonding portions 325 is able to be simplified by an amount corresponding thereto, and thus simplification of the manufacturing steps of the inductor element 3 is provided.

Figure 17A:
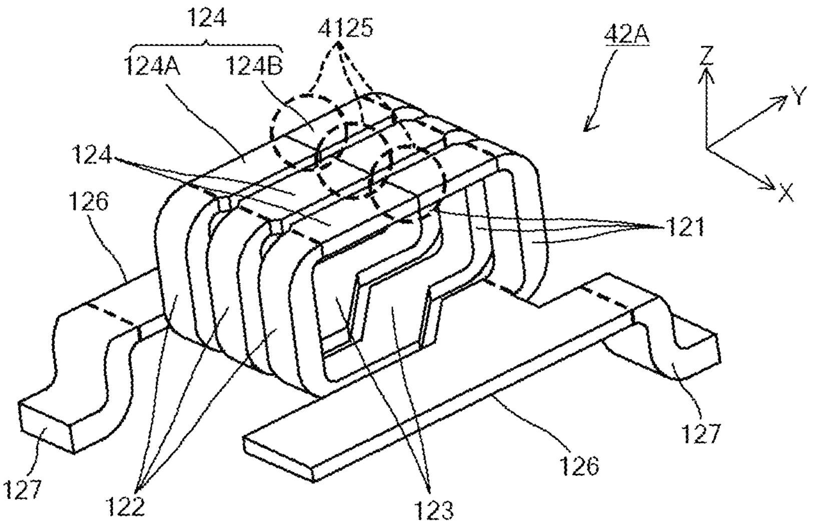
FIG. 17A is a perspective view of a coil according to a modification.
Figure 17B:
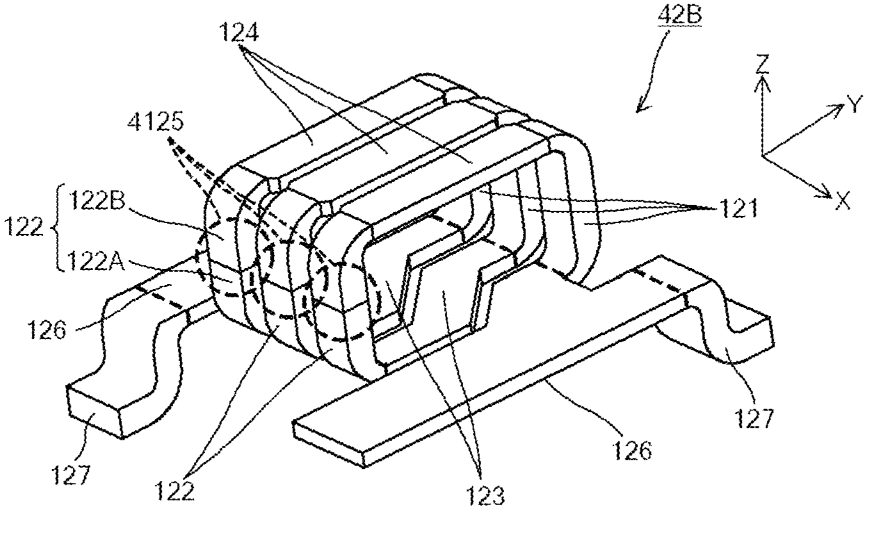
FIG. 17B is a perspective view of a coil according to a modification.
Figure 17C:
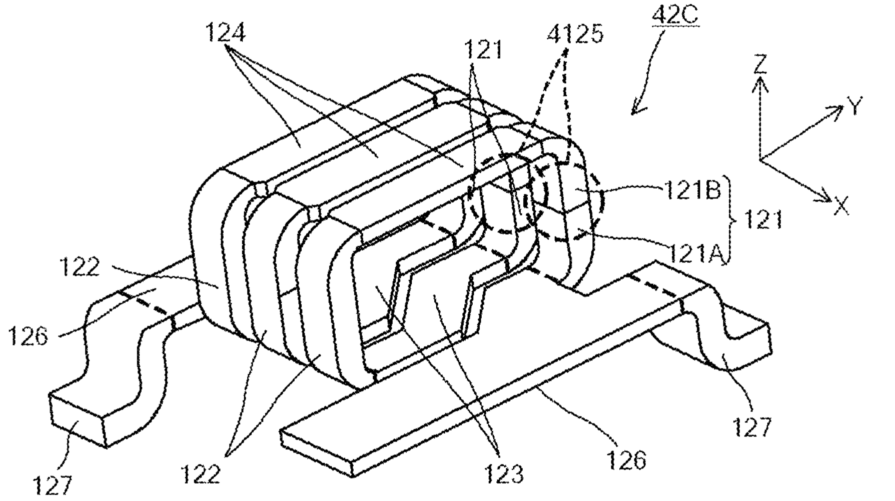
FIG. 17C is a perspective view of a coil according to a modification.

Preferred embodiments of the present invention have been described above, but the present invention is not limited to the features, components, and elements of the above-described preferred embodiments. For example, the inductor element may include a coil 42A in which bonding portions 4125 are provided in the third portion 124 as shown in FIG. 17A, or a coil 42B in which the bonding portions 4125 are provided in the second portion 122 as shown in FIG. 17B. Alternatively, as shown in FIG. 17C, the inductor element may include a coil 42C in which the bonding portions 4125 are provided in the first portion 121. The bonding portion 4125 has a shape that extends linearly in the width direction of the first portion 121, the second portion 122, or the third portion 124 when viewed from the thickness direction of the first portion 121, the second portion 122, or the third portion 124. Furthermore, the bonding portion 4125 has a shape that extends linearly in the thickness direction of the first portion 121, the second portion 122, or the third portion 124 when viewed from a direction orthogonal or substantially orthogonal to the thickness direction of the first portion 121, the second portion 122, or the third portion 124.

As shown in FIG. 17A, in the coil 42A, the third portion 124 includes two sub-portions 124A and 124B. Furthermore, as shown in FIG. 17B, in the coil 42B, the second portion 122 includes two sub-portions 122A and 122B. Furthermore, as shown in FIG. 17C, in the coil 42C, the first portion 121 includes two sub-portions 121A and 121B. In the case of the coil 42A shown in FIG. 17A, the sixth portion of the first base material that defines and functions as the base of the coil 42A corresponds to the first portion 121 and the sub-portion 124B, and the seventh portion of the first base material corresponds to the second portion 122 and the sub-portion 124A. Furthermore, in the case of the coil 42B shown in FIG. 17B, the sixth portion of the first base material that defines and functions as the base of the coil 42B corresponds to the first portion 121, the third portion 124, and the sub-portion 122B, and the seventh portion of the first base material corresponds to the sub-portion 122A. Furthermore, in the case of the coil 42C shown in FIG. 17C, the sixth portion of the first base material that defines and functions as the base of the coil 42C corresponds to the sub-portion 121A, and the seventh portion of the first base material corresponds to the second portion 122, the third portion 124, and the sub-portion 121B. Note that the inductor element including the coil 42A, 42B, or 42C includes, for example, the magnetic body core 11 according to the first and second preferred embodiments.

Accordingly, for example, the position of the bonding portion 4125 is able to be changed in accordance with the features and structure of the laser beam source LS that irradiates the coils 42A, 42B, and 42C with the laser beam LA, and various manufacturing conditions are able to implemented.

In the above-described modifications shown in FIGS. 17A to 17C, the example has been described in which the bonding portion 4125 has a shape that extends linearly in the width direction of the first portion 121, the second portion 122, or the third portion 124 when viewed from the thickness direction of the first portion 121, the second portion 122, or the third portion 124. However, the features, components, and elements are not limited thereto, and for example, as shown in FIGS. 18A to 18E, the length in the direction orthogonal or substantially orthogonal to the thickness direction of the first portion 121, the second portion 122, or the third portion 124 of the bonding portion 4125 may be longer than the length in the width direction of the first portion 121, the second portion 122, or the third portion 124. Here, the above-described sub-portions 121A, 122B, and 124B each correspond to portion of the sixth portion of the first base material, and the above-described sub-portions 121B, 122A, and 124A each correspond to portion of the seventh portion of the first base material. Accordingly, in other words, the length of the bonding portion 4125 in the direction orthogonal or substantially orthogonal to the thickness direction of the sixth portion and the seventh portion of the first base material is longer than the length in the width direction orthogonal or substantially orthogonal to the thickness direction of the sixth portion and the seventh portion and orthogonal or substantially orthogonal to the extension direction of the sixth portion and the seventh portion.

Figure 18A:
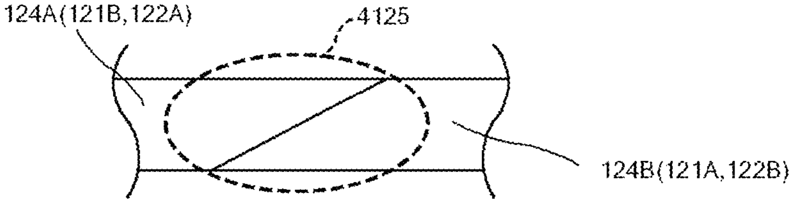
FIG. 18A is a plan view of a bonding portion of a coil according to a modification.
Figure 18B:
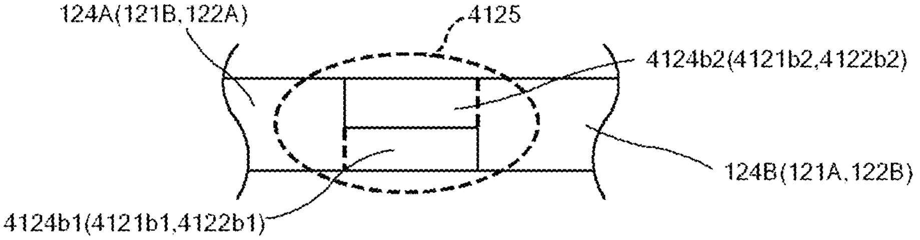
FIG. 18B is a plan view of a bonding portion of a coil according to a modification.

In a modification shown in FIG. 18A, a tip end portion inclined relative to the width direction of the sub-portion 121A, 122B, or 124B in plan view, and a tip end portion inclined relative to the width direction of the sub-portion 121B, 122A, or 124A in plan view are bonded in a state of being in contact with each other. Accordingly, the bonding portion 4125 extending in the direction inclined relative to the width direction of the first portion 121, the second portion 122, or the third portion 124 is formed between the sub-portion 121A, 122B, or 124B and the sub-portion 121B, 122A, or 124A. In a modification shown in FIG. 18B, at the tip end portion of the sub-portion 121A, 122B, or 124B, one narrow width portion **4124*b*1, 4121*b*1, or 4122*b*1, having a rectangular or substantially rectangular shape in plan view, is provided at a position deviated toward one side in the width direction thereof. Furthermore, at the tip end portion of the sub-portion 121B, 122A, or 124A, one narrow width portion 4124*b*2, 4121*b*2, or 4122*b*2, having a rectangular or substantially rectangular shape in plan view, is provided at a position deviated toward the other side in the width direction thereof. Then, in a state in which the narrow width portion 4124*b*1, 4121*b*1, or 4122*b*1 and the narrow width portion 4124*b*2, 4121*b*2, or 4122*b*2 are adjacent to each other in the width direction thereof, the sub-portion 121A, 122B, or 124B and the sub-portion 121B, 122A, or 124A are bonded to each other. Accordingly, the bonding portion 4125 bent in an S-shape is provided between the sub-portion 121A, 122B, or 124B and the sub-portion 121B, 122A, or 124**A.

Figure 18C:
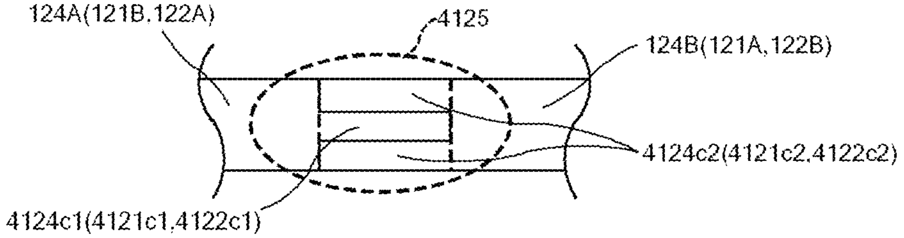
FIG. 18C is a plan view of a bonding portion of a coil according to a modification.

In a modification shown in FIG. 18C, at the tip end portion of the sub-portion 121A, 122B, or 124B, one narrow width portion **4124*c*1, 4121*c*1, or 4122*c*1, having a rectangular or substantially rectangular shape in plan view, is provided at the center portion in the width direction thereof. Furthermore, at the tip end portion of the sub-portion 121B, 122A, or 124A, two narrow width portions 4124*c*2, 4121*c*2, or 4122*c*2, each having a rectangular or substantially rectangular shape in plan view, are provided on both ends, respectively, in the width direction thereof. Then, in a state in which the narrow width portion 4124*c*1, 4121*c*1, or 4122*c*1 is fitted between the two narrow width portions 4124*c*2, 4121*c*2, or 4122*c*2, the sub-portion 121A, 122B, or 124B and the sub-portion 121B, 122A, or 124A are bonded to each other. Accordingly, the bonding portion 4125 bent in a C-shape is provided between the sub-portion 121A, 122B, or 124B and the sub-portion 121B, 122A, or 124**A.

Figure 18D:
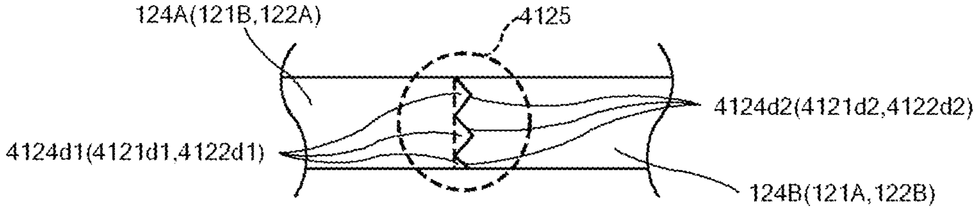
FIG. 18D is a plan view of a bonding portion of a coil according to a modification.

In a modification shown in FIG. 18D, the tip end portion of the sub-portion 121A, 122B, or 124B, and the tip end portion of the sub-portion 121B, 122A, or 124A each have a saw blade shape in plan view. Then, in a state in which crest portions **4124*d*1, 4121*d*1, or 4122*d*1 at the tip end portion of the sub-portion 121A, 122B, or 124B are fitted into trough portions 4124*d*2, 4121*d*2, or 4122*d*2 at the tip end portion of the sub-portion 121B, 122A, or 124A, the sub-portion 121A, 122B, or 124B and the sub-portion 121B, 122A, or 124A are bonded to each other. Accordingly, the bonding portion 4125 bent in a saw blade shape is provided between the sub-portion 121A, 122B, or 124B and the sub-portion 121B, 122A, or 124**A.

Figure 18E:
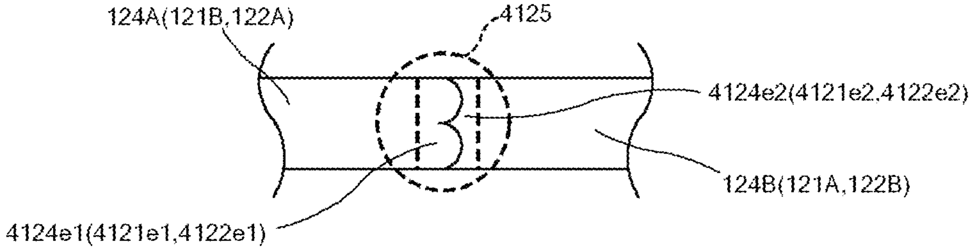
FIG. 18E is a plan view of a bonding portion of a coil according to a modification.

In a modification shown in FIG. 18E, at the tip end portion of the sub-portion 121A, 122B, or 124B, two extending portions **4124*e*1, 4121*e*1, or 4122*e*1, each having a semicircular shape in plan view, are provided. Furthermore, at the tip end portion of the sub-portion 121B, 122A, or 124A, two cutout portions 4124*e*2, 4121*e*2, or 4122*e*2, each having a semicircular shape in plan view, are provided. Then, in a state in which the extending portions 4124*e*1, 4121*e*1, or 4122*e*1 of the sub-portion 121A, 122B, or 124B are fitted into the cutout portions 4124*e*2, 4121*e*2, or 4122*e*2 of the sub-portion 121B, 122A, or 124A, the sub-portion 121A, 122B, or 124B and the sub-portion 121B, 122A, or 124A are bonded to each other. Accordingly, the bonding portion 4125 bent in a semicircular shape is provided between the sub-portion 121A, 122B, or 124B and the sub-portion 121B, 122A, or 124**A.

Therefore, since the length of the bonding portion 4125 is able to be increased, the strength of the bonding portion 4125 is able to be improved.

Figure 19A:
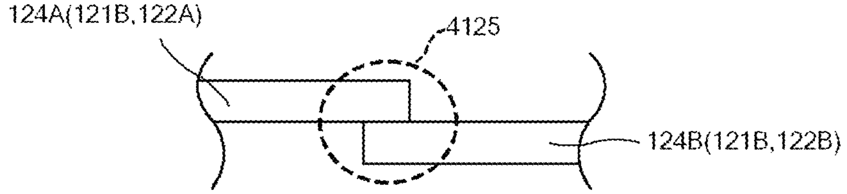
FIG. 19A is a side view of a bonding portion of a coil according to a modification.

Furthermore, in the above-described modifications shown in FIGS. 17A to 17C, the example has been described in which the bonding portion 4125 has a shape that extends linearly in the thickness direction of the first portion 121, the second portion 122, or the third portion 124 when viewed from the direction orthogonal or substantially orthogonal to the thickness direction of the first portion 121, the second portion 122, or the third portion 124. However, the features, components, and elements are not limited thereto, and as shown in FIG. 19A, for example, the tip end portion of the sub-portion 121A, 122B, or 124B and the tip end portion of the sub-portion 121B, 122A, or 124A may be bonded in a state of overlapping with each other in the thickness direction thereof. Accordingly, the bonding portion 4125 has a shape extending in a direction orthogonal or substantially orthogonal to the thickness direction of the sub-portion 121A, 122B, or 124B and the sub-portion 121B, 122A, or 124A.

Figure 19B:
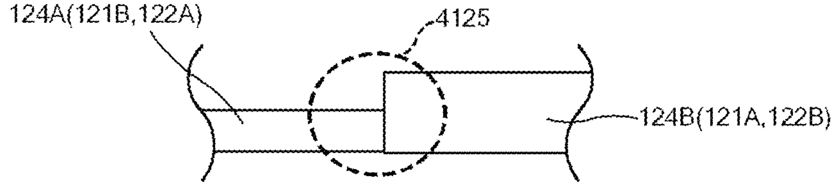
FIG. 19B is a side view of a bonding portion of a coil according to a modification.
Figure 19C:
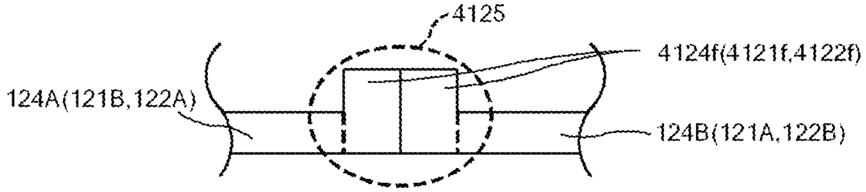
FIG. 19C is a side view of a bonding portion of a coil according to a modification.
Figure 19D:
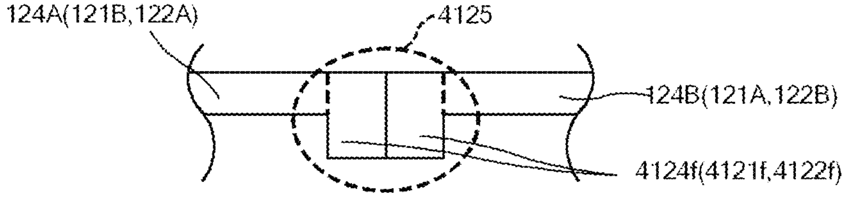
FIG. 19D is a side view of a bonding portion of a coil according to a modification.

Furthermore, as shown in FIG. 19B, the thickness of the tip end portion of the sub-portion 121A, 122B, or 124B and the thickness of the tip end portion of the sub-portion 121B, 122A, or 124A may be different from each other. Accordingly, the bonding portion 4125 is provided at a portion of the tip end portion of the sub-portion 121B, 122A, or 124A that comes into contact with the tip end portion of the sub-portion 121A, 122B, or 124B. Alternatively, as shown in FIG. 19C or 19D, the tip end portion of the sub-portion 121A, 122B, or 124B and the tip end portion of the sub-portion 121B, 122A, or 124A may each be provided with a bent portion **4124*f*, 4121*f*, or 4122*f* that is bent in the thickness direction thereof. Then, the bonding portion 4125 may be provided by bonding the bent portion 4124*f*, 4121*f*, or 4122*f* of the sub-portion 121A, 122B, or 124B and the bent portion 4124*f*, 4121*f*, or 4122*f* of the sub-portion 121B, 122A, or 124**A to each other.

Figure 19E:
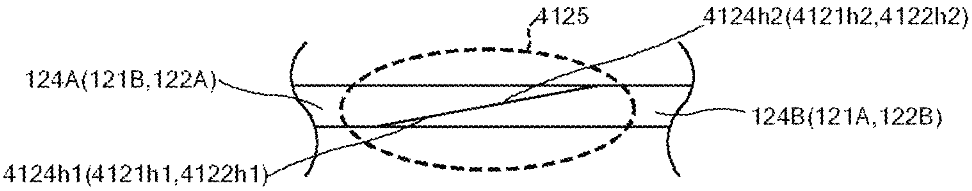
FIG. 19E is a side view of a bonding portion of a coil according to a modification.

Furthermore, as shown in FIG. 19E, the tip end portion of the sub-portion 121A, 122B, or 124B may include an inclined surface **4121*h*1, 4122*h*1, or 4124*h*1 inclined and the thickness from the one surface side in the thickness direction decreases toward the tip end side thereof, and the tip end portion of the sub-portion 121B, 122A, or 124A may include an inclined surface 4121*h*2, 4122*h*2, or 4124*h*2 inclined and the thickness from the one surface side in the thickness direction decreases toward the tip end side thereof. Accordingly, in a state in which the inclined surface 4121*h*1, 4122*h*1, or 4124*h*1 and the inclined surface 4121*h*2, 4122*h*2, or 4124*h*2 are in surface contact with each other, the bonding portion 4125 may be provided by the sub-portion 121A, 122B, or 124B and the sub-portion 121B, 122A, or 124**A being bonded to each other.

Figure 19F:
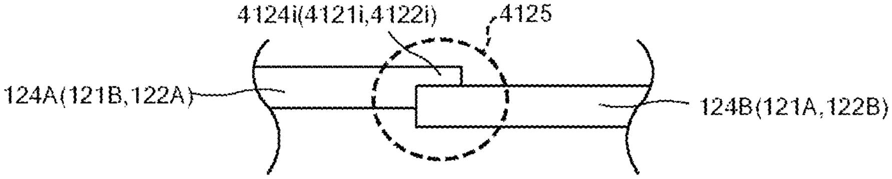
FIG. 19F is a side view of a bonding portion of a coil according to a modification.
Figure 19G:
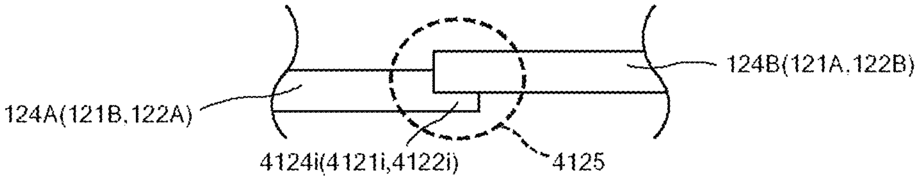
FIG. 19G is a side view of a bonding portion of a coil according to a modification.

Furthermore, as shown in FIGS. 19F and 19G, a thin portion **4121*i*, 4122*i*, or 4124*i* may be provided at the tip end portion of the sub-portion 121A, 122B, or 124B, and the sub-portion 121A, 122B, or 124B and the sub-portion 121B, 122A, or 124A may be bonded to each other in a state in which the tip end portion of the sub-portion 121B, 122A, or 124A is in surface contact with one surface side in the thickness direction thereof. Accordingly, the bonding portion 4125 is provided at a portion where the one surface of the thin portion 4121*i*, 4122*i*, or 4124*i* in the thickness direction and the tip end portion of the sub-portion 121B, 122A, or 124**A are in surface contact with each other.

Figure 20A:
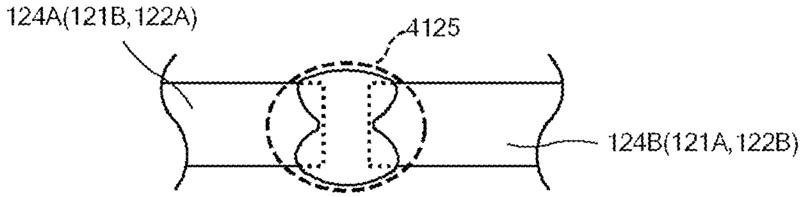
FIG. 20A is a side view of a bonding portion of a coil according to a modification.
Figure 20B:
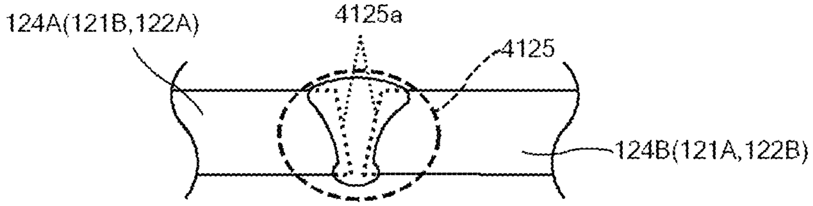
FIG. 20B is a side view of a bonding portion of a coil according to a modification.
Figure 20C:
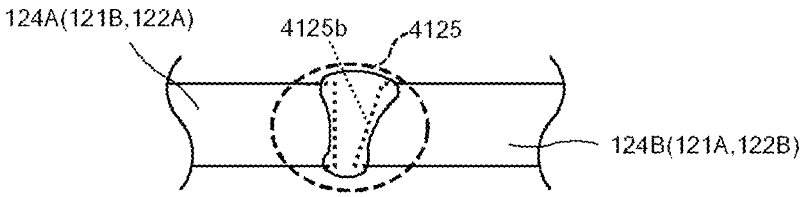
FIG. 20C is a side view of a bonding portion of a coil according to a modification.
Figure 20D:
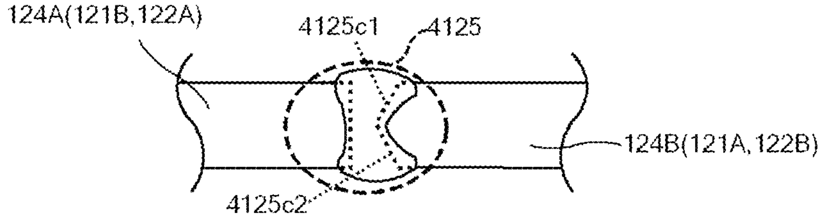
FIG. 20D is a side view of a bonding portion of a coil according to a modification.

Furthermore, as shown in FIG. 20A, the bonding portion 4125 may be formed by welding in a state in which a gap is provided between the tip end portion of the sub-portion 121A, 122B, or 124B and the tip end portion of the sub-portion 121B, 122A, or 124A. Accordingly, the bonding portion 4125 has an I-shape. Alternatively, as shown in FIG. 20B, at the tip end portion of the sub-portion 121A, 122B, or 124B and the tip end portion of the sub-portion 121B, 122A, or 124A, inclined surfaces **4125*a* inclined to approach each other toward one direction side in the thickness direction may be respectively provided. Accordingly, the bonding portion 4125 has a V-shape. Furthermore, as shown in FIG. 20C, only at the tip end portion of the sub-portion 121A, 122B, or 124B, an inclined surface 4125*b* inclined to approach the tip end portion of the sub-portion 121B, 122A, or 124A toward one direction side in the thickness direction may be provided. Accordingly, the bonding portion 4125 has an inclined V-shape. Alternatively, as shown in FIG. 20D, at the tip end portion of the sub-portion 121A, 122B, or 124B, two inclined surfaces 4125*c*1 and 4125*c*2 that are inclined and the center portion in the thickness direction protrudes most toward the tip end portion side of the sub-portion 121B, 122A, or 124A, and to separate from the tip end portion of the sub-portion 121B, 122A, or 124A toward both end sides in the thickness direction may be provided. Accordingly, the bonding portion 4125** has a K-shape.

Figure 20E:
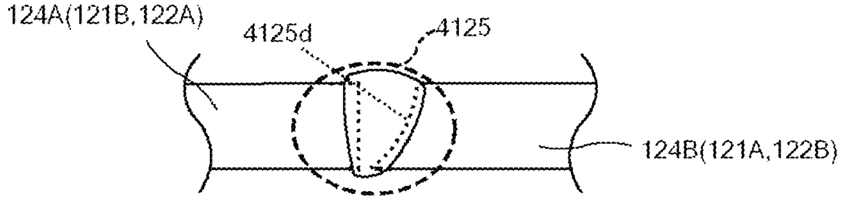
FIG. 20E is a side view of a bonding portion of a coil according to a modification.
Figure 20F:
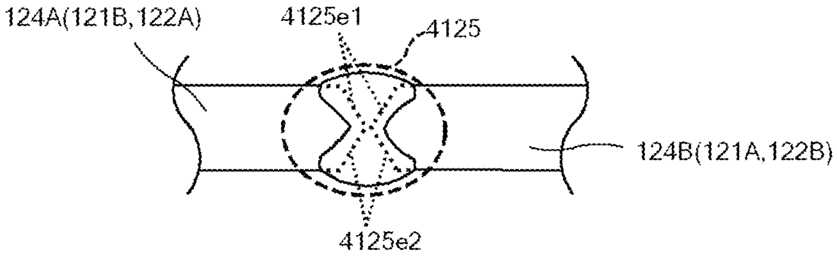
FIG. 20F is a side view of a bonding portion of a coil according to a modification.

Furthermore, as shown in FIG. 20E, only at the tip end portion of the sub-portion 121A, 122B, or 124B, a curved surface **4125*d* curved to approach the tip end portion of the sub-portion 121B, 122A, or 124A toward one direction side in the thickness direction may be provided. Accordingly, the bonding portion 4125 has a J-shape. Alternatively, as shown in FIG. 20F, at the tip end portion of the sub-portion 121A, 122B, or 124B and the tip end portion of the sub-portion 121B, 122A, or 124A, inclined surfaces 4125*e*1 and 4125*e*2 that are inclined and the center portions in the thickness direction protrude in a direction in which the both come closest to each other, and separate from each other toward both end sides in the thickness direction may be respectively provided. Accordingly, the bonding portion 4125** has an X-shape.

Figure 21A:
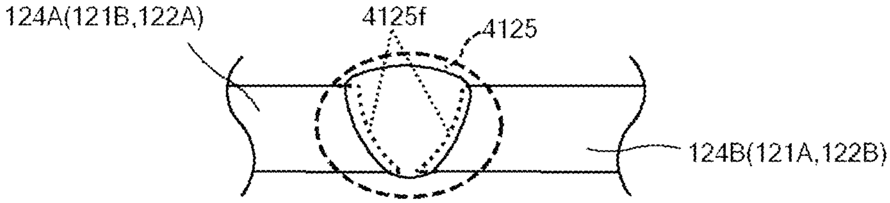
FIG. 21A is a side view of a bonding portion of a coil according to a modification.
Figure 21B:
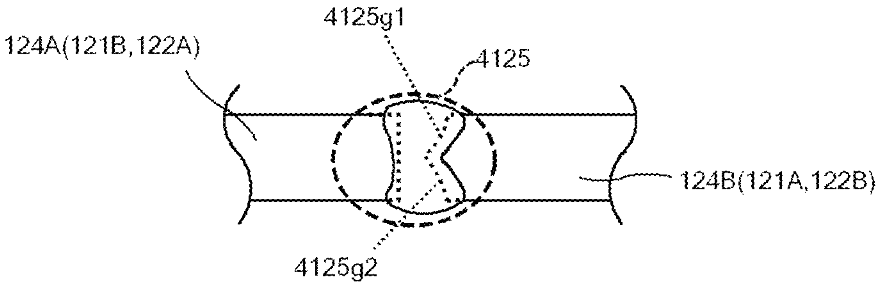
FIG. 21B is a side view of a bonding portion of a coil according to a modification.
Figure 21C:
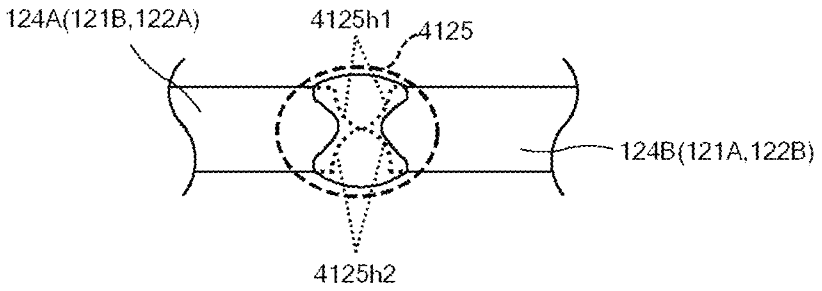
FIG. 21C is a side view of a bonding portion of a coil according to a modification.

Furthermore, as shown in FIG. 21A, at the tip end portion of the sub-portion 121A, 122B, or 124B and the tip end portion of the sub-portion 121B, 122A, or 124A, curved surfaces 4125*f* curved to approach each other toward one direction side in the thickness direction may be respectively provided. Accordingly, the bonding portion 4125 has a U-shape. Alternatively, as shown in FIG. 21B, at the tip end portion of the sub-portion 121A, 122B, or 124B, two curved surfaces 4125*g*1 and 4125*g*2 that are curved and the center portion in the thickness direction protrudes most toward the tip end portion side of the sub-portion 121B, 122A, or 124A, and separate from the tip end portion of the sub-portion 121B, 122A, or 124A toward both end sides in the thickness direction may be provided. Accordingly, the bonding portion 4125 has a J-shape in both surfaces. Furthermore, as shown in FIG. 21C, at the tip end portion of the sub-portion 121A, 122B, or 124B and the tip end portion of the sub-portion 121B, 122A, or 124A, curved surfaces 4125*h*1 and 4125*h*2 that are curved and the center portions in the thickness direction protrude in a direction in which the both come closest to each other, and separate from each other toward both end sides in the thickness direction may be respectively provided. Accordingly, the bonding portion 4125 has an H-shape.

Figure 22A:
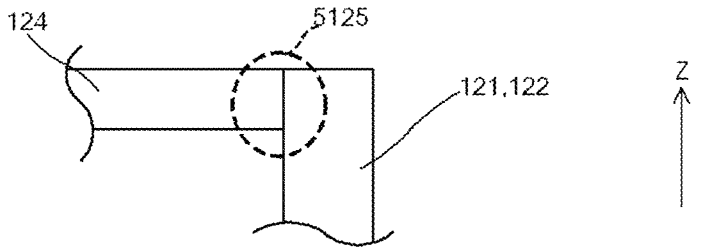
FIG. 22A is a side view of a bonding portion of a coil according to a modification.
Figure 22B:
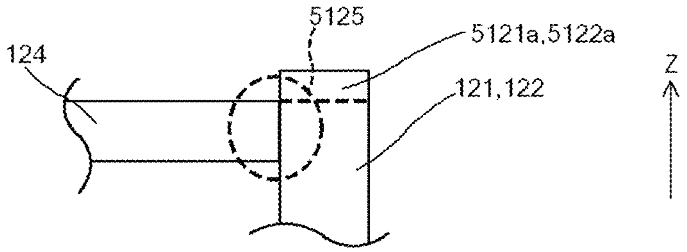
FIG. 22B is a side view of a bonding portion of a coil according to a modification.
Figure 22C:
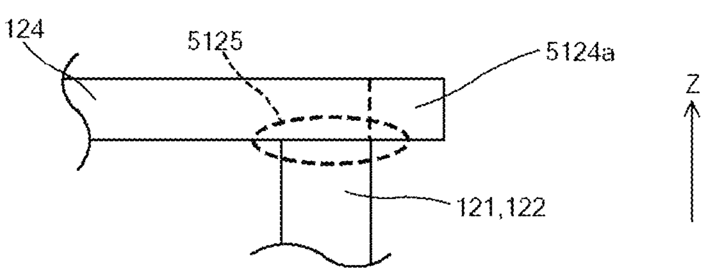
FIG. 22C is a side view of a bonding portion of a coil according to a modification.

In the first preferred embodiment, an example has been described in which, in a state in which the second bonding surface 1125B on the +Z direction side of the tip end portion of the first portion 121 is brought into surface contact with the first bonding surface 1125A of the side surface on the −Z direction side of the end portion of the third portion 124, the bonding portion 125 is formed by bonding the tip end portion of the first portion 121 and the end portion of the third portion 124 to each other. However, the features, components, and elements are not limited thereto, and, for example, as shown in a bonding portion 5125 shown in FIG. 22A, in a state in which the tip end portion of the third portion 124 is in surface contact with the side surface of the tip end portion of the first portion 121 or the second portion 122, the first portion 121 or the second portion 122 and the third portion 124 may be bonded to each other. Furthermore, as shown in FIG. 22B, a tip end portion 5121*a* or 5122*a* of the first portion 121 or the second portion 122 may protrude toward the +Z direction side relative to the bonding portion 5125 of the first portion 121 or the second portion 122 with the third portion 124. Alternatively, as shown in FIG. 22C, the second bonding surface on the +Z direction side of the first portion 121 or the second portion 122 may be bonded to the first bonding surface of the side surface on the −Z direction side of the end portion of the third portion 124 in a state of being in surface contact with each other, and a tip end portion 5124*a* of the third portion 124 may protrude in the direction orthogonal or substantially orthogonal to the Z-axis direction relative to the bonding portion 5125 with the first portion 121 or the second portion 122.

Figure 22D:
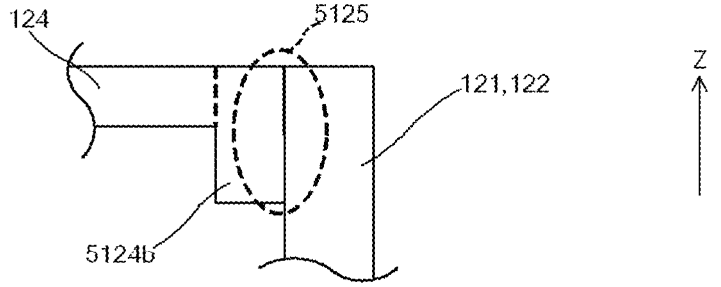
FIG. 22D is a side view of a bonding portion of a coil according to a modification.
Figure 22E:
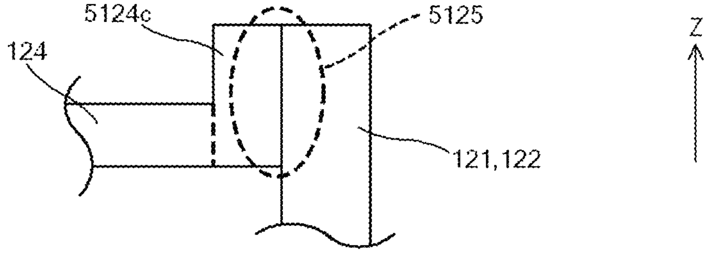
FIG. 22E is a side view of a bonding portion of a coil according to a modification.
Figure 23A:
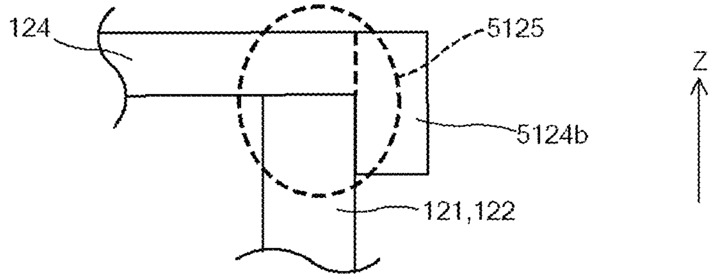
FIG. 23A is a side view of a bonding portion of a coil according to a modification.
Figure 23B:
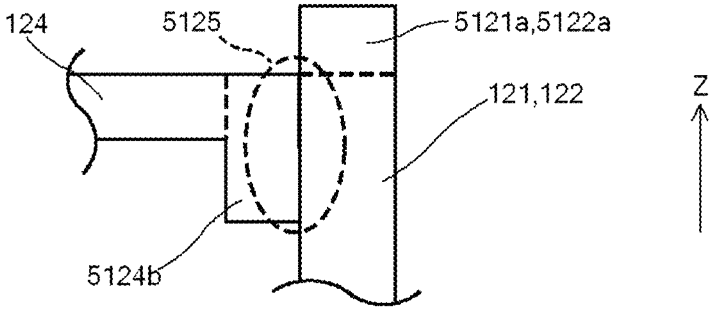
FIG. 23B is a side view of a bonding portion of a coil according to a modification.

Furthermore, as shown in FIG. 22D, a bent portion 5124*b* bent in the −Z direction may be provided at the end portion of the third portion 124, and the bonding portion 5125 may be formed in a state in which the side surface of the bent portion 5124*b* is in surface contact with the side surface of the first portion 121 or the second portion 122. Alternatively, as shown in FIG. 22E, a bent portion 5124*c* bent in the +Z direction may be provided at the end portion of the third portion 124, and the bonding portion 5125 may be provided in a state in which the side surface of the bent portion 5124*c* is in surface contact with the side surface of the first portion 121 or the second portion 122. Furthermore, as shown in FIG. 23A, the bonding portion 5125 may be provided in a state in which the end surface on the +Z direction side of the tip end portion of the first portion 121 or the second portion 122 is in surface contact with the side surface of the third portion 124, and the side surface on one direction side orthogonal or substantially orthogonal to the Z-axis direction of the tip end portion of the first portion 121 or the second portion 122 is in surface contact with the bent portion 5124*b*. Furthermore, as shown in FIG. 23B, the bonding portion 5125 may be provided in a state in which the side surface of the bent portion 5124*b* bent in the −Z direction of the end portion of the third portion 124 is in surface contact with the side surface of the first portion 121 or the second portion 122, and the end portion 5121*a* or 5121*b* on the +Z direction side of the first portion 121 or the second portion 122 may protrude in the +Z direction side relative to the bonding portion 5125.

Figure 23C:
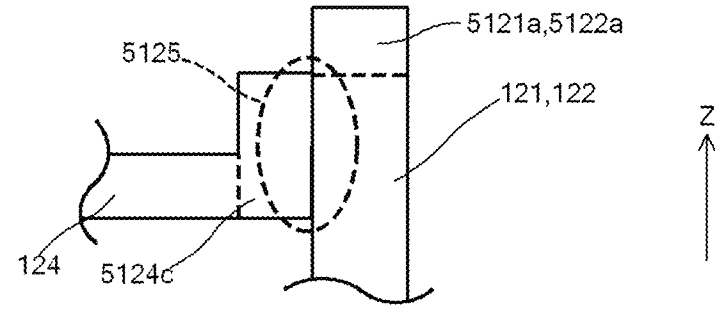
FIG. 23C is a side view of a bonding portion of a coil according to a modification.
Figure 23D:
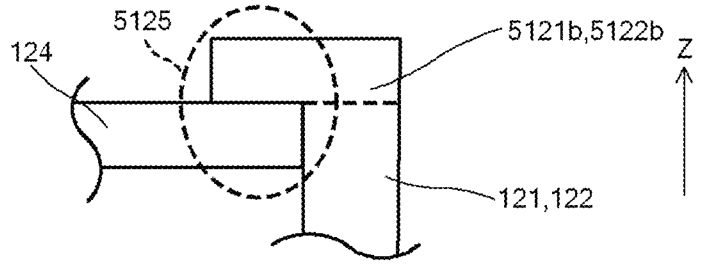
FIG. 23D is a side view of a bonding portion of a coil according to a modification.

Alternatively, as shown in FIG. 23C, the bonding portion 5125 may be provided in a state in which the side surface of the bent portion 5124*c* bent in the +Z direction of the end portion of the third portion 124 is in surface contact with the side surface of the first portion 121 or the second portion 122, and the end portion 5121*a* or 5121*b* on the +Z direction side of the first portion 121 or the second portion 122 may protrude in the +Z direction side relative to the bonding portion 5125. Furthermore, as shown in FIG. 23D, at the end portion on the +Z direction side of the first portion 121 or the second portion 122, a bent portion 5121*b* or 5122*b* bent in a direction orthogonal or substantially orthogonal to the Z-axis direction may be provided. The bonding portion 5125 may be provided in a state in which the end surface on the +Z direction side of the tip end portion of the third portion 124 is in surface contact with the side surface of the bent portion 5121*b* or 5122*b*, and the end surface on the extension direction side of the tip end portion of the third portion 124 is in surface contact with the side surface of the first portion 121 or the second portion 122.

Figure 24A:
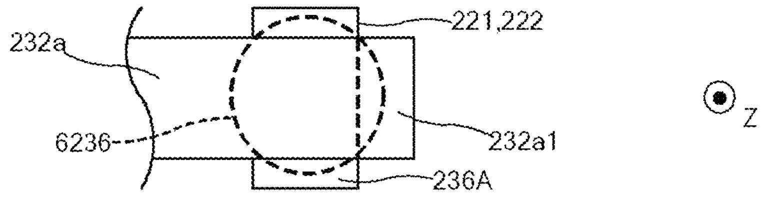
FIG. 24A is a plan view of a bonding portion of a coil according to a modification.
Figure 24B:
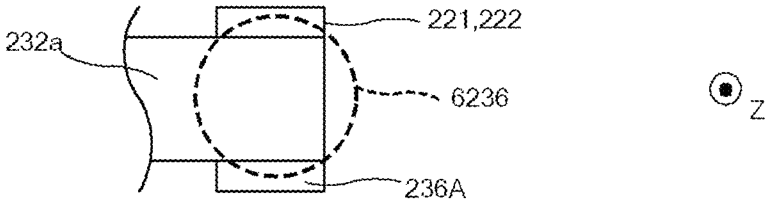
FIG. 24B is a plan view of a bonding portion of a coil according to a modification.

In the second preferred embodiment, an example has been described in which, when viewed from the Z-axis direction, the bonding portion 236 is provided in a state in which the portion of the first portion 221 or the second portion 222 that does not overlap with the tongue piece portion 232*a* is present on the extending direction side of the tongue piece portion 232*a* of the third portion 232. However, the features, components, and elements are not limited thereto, and, for example, as in a bonding portion 6236 shown in FIG. 24A, when viewed from the Z-axis direction, the bonding portion 6236 may be formed in a state in which a tip end portion 232*a*1 of the tongue piece portion 232*a* projects in the extending direction side of the tongue piece portion 232*a* relative to the first portion 221 or the second portion 222. Alternatively, as in the bonding portion 6236 shown in FIG. 24B, when viewed from the Z-axis direction, the bonding portion 6236 may be formed in a state in which a tip end edge of the tongue piece portion 232*a* match an end edge of the first portion 221 or the second portion 222 on the extending direction side of the tongue piece portion 232*a*.

Figure 24C:
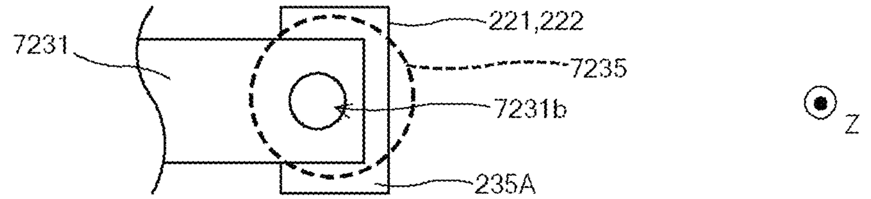
FIG. 24C is a plan view of a bonding portion of a coil according to a modification.
Figure 24D:
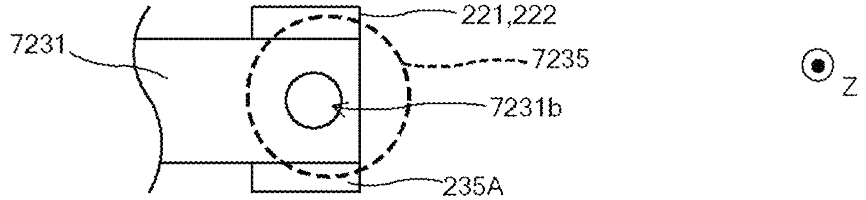
FIG. 24D is a plan view of a bonding portion of a coil according to a modification.

In the second preferred embodiment, an example has been described in which, when viewed from the Z-axis direction, the bonding portion 235 is formed in a state in which the tip end portion of the third portion 231 projects to the extending direction side of the third portion 231 relative to the first portion 221 or the second portion 222. However, the features, components, and elements are not limited thereto, and, for example, as in a bonding portion 7235 shown in FIG. 24C, when viewed from the Z-axis direction, the bonding portion 7235 may be provided in a state in which a portion of the first portion 221 or the second portion 222 that dos not overlap with a third portion 7231 on the extending direction side of the third portion 7231 is present. Alternatively, as in the bonding portion 7235 shown in FIG. 24D, when viewed from the Z-axis direction, the bonding portion 7235 may be provided in a state in which a tip end edge of the third portion 7231 match an end edge of the first portion 221 or the second portion 222 on the extending direction side of the third portion 7231.

Figure 24E:
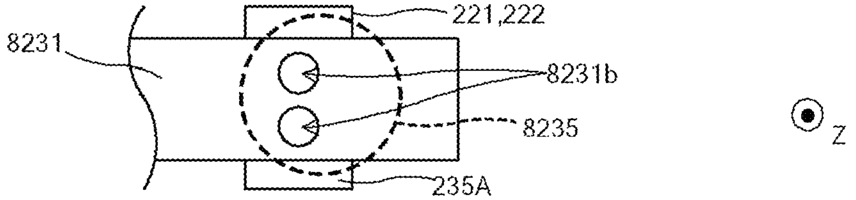
FIG. 24E is a plan view of a bonding portion of a coil according to a modification.
Figure 24F:
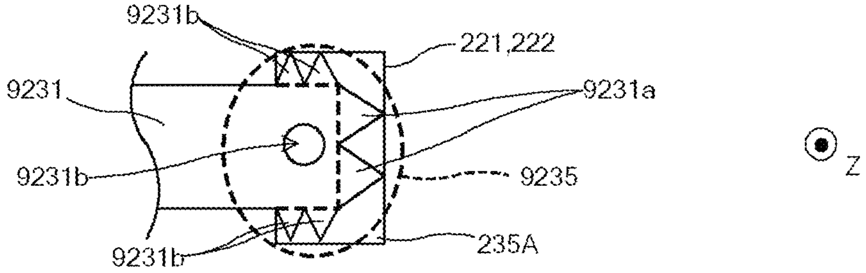
FIG. 24F is a plan view of a bonding portion of a coil according to a modification.
Figure 25A:
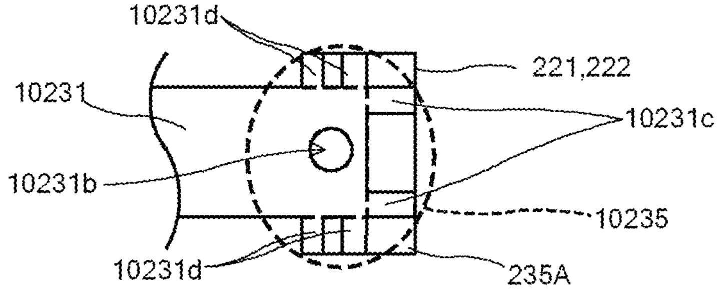
FIG. 25A is a plan view of a bonding portion of a coil according to a modification.

In the second preferred embodiment, although an example has been described in which the one through-hole 231*b* is provided in the end portion of the third portion 231, the features, components, and elements are not limited thereto, and as in a bonding portion 8235 shown in FIG. 24E, for example, a plurality of (two in FIG. 24E) through-holes 8231*b* may be provided in the end portion of a third portion 8231. Furthermore, as in a bonding portion 9235 shown in FIG. 24F, at an end portion of a third portion 9231, two extending pieces 9231*a*, each having a triangular shape in plan view, extending in the extension direction of the third portion 9231, four extending pieces 9231*b*, each having a triangular shape in plan view, respectively extending from both sides in a direction orthogonal or substantially orthogonal to the extension direction of the third portion 9231, and a through-hole 9231*b* may be provided. Alternatively, as in a bonding portion 10235 shown in FIG. 25A, at an end portion of a third portion 10231, two extending pieces 10231*c*, each having a substantially rectangular shape in plan view, extending in the extension direction of the third portion 10231, four extending pieces 10231*d*, each having a substantially rectangular shape in plan view, respectively extending from both sides in a direction orthogonal or substantially orthogonal to the extension direction of the third portion 10231, and a through-hole 10231*b* may be provided.

Figure 25B:
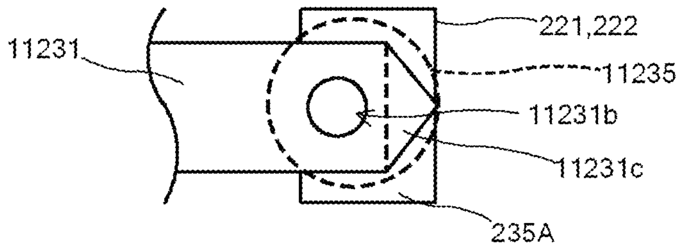
FIG. 25B is a plan view of a bonding portion of a coil according to a modification.
Figure 25C:
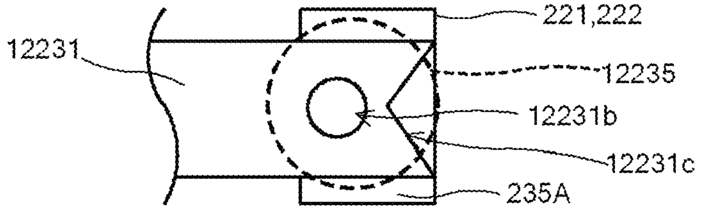
FIG. 25C is a plan view of a bonding portion of a coil according to a modification.
Figure 25D:
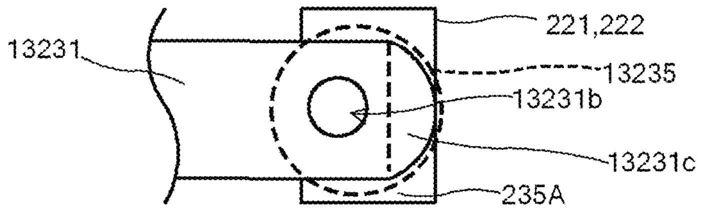
FIG. 25D is a plan view of a bonding portion of a coil according to a modification.
Figure 25E:
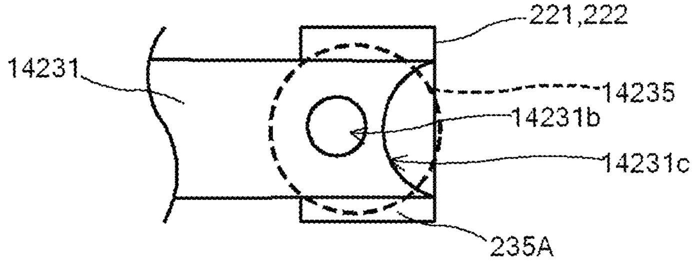
FIG. 25E is a plan view of a bonding portion of a coil according to a modification.

In the second preferred embodiment, although an example has been described in which the end portion of the third portion 231 has a substantially rectangular shape in plan view, the shape of the end portion of the third portion 231 is not limited thereto. For example, as in a bonding portion 11235 shown in FIG. 25B, at an end portion of a third portion 11231, an extending portion 11231*c* having a triangular shape in plan view and a through-hole 11231*b* may be provided. Furthermore, as in a bonding portion 12235 shown in FIG. 25C, at an end portion of a third portion 12231, a cutout portion 12231*c* having a triangular shape in plan view and a through-hole 12231*b* may be provided. Alternatively, as in a bonding portion 13235 shown in FIG. 25D, at the end portion of the third portion 13231, an extending portion 13231*c* having a semicircular shape in plan view and a through-hole 13231*b* may be provided. Furthermore, as in a bonding portion 14235 shown in FIG. 25E, at an end portion of a third portion 14231, a cutout portion 14231*c* having a semicircular shape in plan view and a through-hole 14231*b* may be provided.

Figure 26:
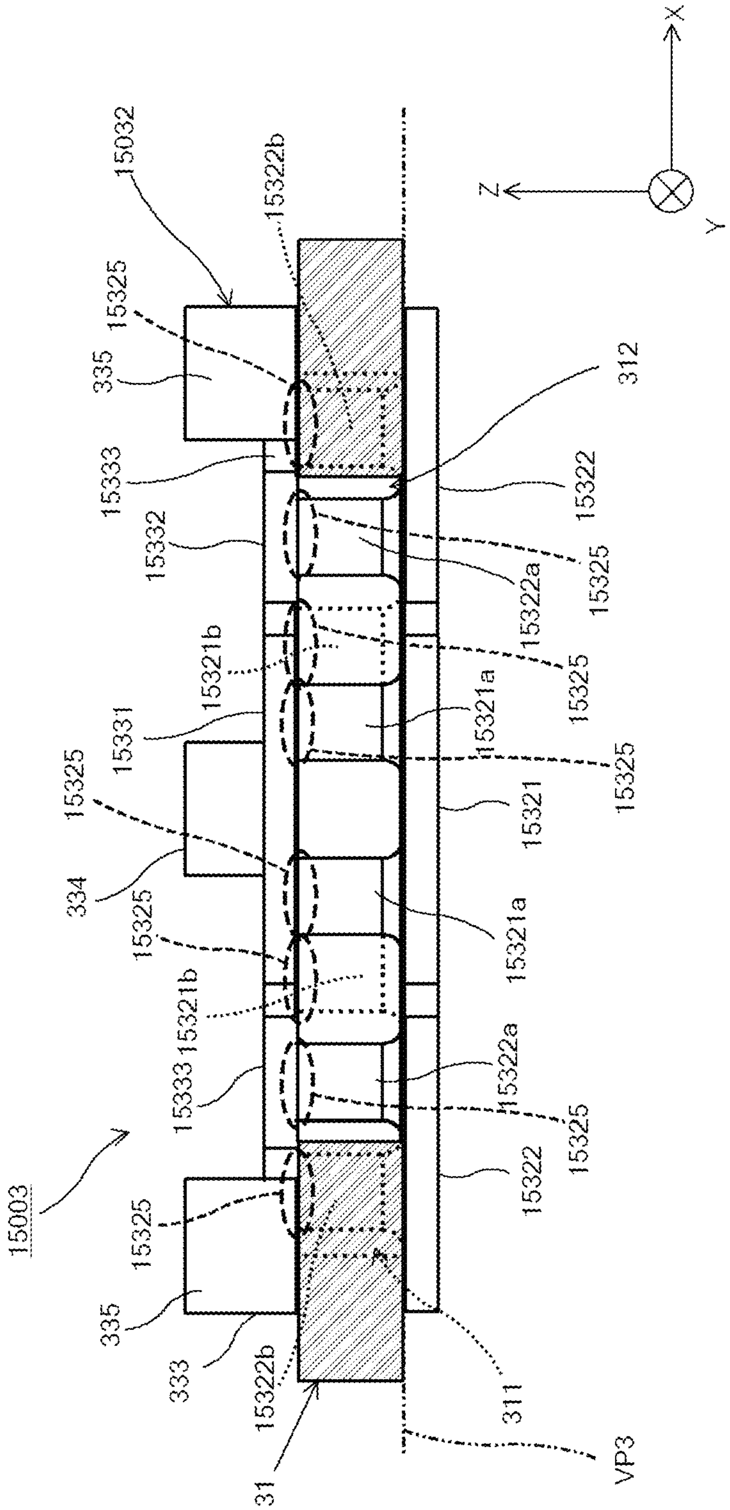
FIG. 26 is a partial cross-sectional view of an inductor element according to a modification.

In the third preferred embodiment, an example has been described in which the protruding portions 331*a*, 332*a*, 332*b*, and 333*b* are provided in the first conductor pieces 331, 332, and 333, and the protruding portions 321*a*, 321*b*, 322*a*, 322*b*, 333*a*, and 333*b* are also provided in the second conductor pieces 321 and 322. However, the features, components, and elements are not limited thereto, and as in an inductor element 15003 shown in FIG. 26, for example, a coil 15032 may be included in which only the first conductor pieces 15331, 15332, and 15333 are provided with the protruding portions 15331*a*, 15332*a*, 15332*b*, and 15333*b*, and the second conductor pieces 15321 and 15322 are provided with no protruding portion.

Here, the two protruding portions 15321*a* of the second conductor piece 15321 are bonded to the first conductor piece 15331. The two protruding portions 15321*b* of the second conductor piece 15321 are respectively bonded to the first conductor pieces 15332 overlapping in the Z-axis direction. The respective protruding portions 15322*a* of the two second conductor pieces 15322 are respectively bonded to the first conductor pieces 15332 overlapping in the Z-axis direction. The respective protruding portions 15322*b* of the two second conductor pieces 15322 are respectively bonded to the first conductor pieces 15333 overlapping in the Z-axis direction. As described above, eight bonding portions 15325 are provided between the first conductor pieces 15331, 15332, and 15333 and the protruding portions 15321*a*, 15321*b*, 15322*a*, and 15322*b* of the second conductor pieces 15321 and 15322.

Although preferred embodiments and modifications of the present invention (including those described in notes, the same applies hereinafter) have been described above, the present invention is not limited thereto. The present invention encompasses combinations of the preferred embodiments and modifications and the combinations to which changes are implemented.

The present application is based on Japanese Patent Application No. 2018-072095 filed on Apr. 4, 2018. In the present specification, the specification, the scope of claims, and the drawings of Japanese Patent Application No. 2018-072095 are incorporated by reference in their entirety.

Preferred embodiments of the present invention are suitable for inductor elements included in various electronic devices, for example, a mobile phone, a personal computer, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inductor element comprising:

a magnetic body core provided with a first through-hole; and a coil inserted through the first through-hole and wound around the magnetic body core a plurality of times; wherein the coil includes:

a plurality of bonding portions;

a plurality of first conductor pieces provided on one side of the magnetic body core in a thickness direction; and a plurality of second conductor pieces provided on another side of the magnetic body core in the thickness direction;

the plurality of bonding portions are located on a first virtual plane that partially intersects with the coil;

at least one of the plurality of second conductor pieces includes:

a protruding portion that protrudes in the thickness direction and is bonded to at least one of the plurality of first conductor pieces; and a recessed portion provided at a portion of the at least one of the plurality of second conductor pieces corresponding to an opposite side of the protruding portion, and a bottom portion of the recessed portion corresponds to a tip end portion of the protruding portion; and the recessed portion passes through the at least one of the plurality of second conductor pieces and extends into the protruding portion.

2. The inductor element according to claim 1, wherein the plurality of bonding portions are provided by respectively bonding a plurality of first bonding surfaces of a same number as the plurality of bonding portions and a plurality of second bonding surfaces respectively in surface contact with the plurality of first bonding surfaces; and the plurality of first bonding surfaces and the plurality of second bonding surfaces are located on the first virtual plane.

3. The inductor element according to claim 1, wherein the magnetic body core further includes a second through-hole;

the coil includes a plurality of first portions, a plurality of second portions, a third portion, and a fourth portion each of which has a flat plate shape;

the plurality of first portions are arrayed and inserted through the first through-hole;

the plurality of second portions is arrayed and inserted through the second through-hole;

the third portion connects one end of each of the plurality of first portions in a longitudinal direction and one end of each of the plurality of second portions in the longitudinal direction; and the fourth portion connects another end of each of the plurality of first portions in the longitudinal direction and another end of each of the plurality of second portions in the longitudinal direction.

4. The inductor element according to claim 3, wherein the plurality of bonding portions are located only on one side of the first through-hole and the second through-hole of the magnetic body core in the thickness direction.

5. The inductor element according to claim 1, wherein the first through-hole penetrates through the magnetic body core in the thickness direction of the magnetic body core.

6. The inductor element according to claim 3, wherein the first through-hole and the second through-hole are separated from each other in the longitudinal direction of the magnetic body core.

7. The inductor element according to claim 1, wherein the magnetic body includes laminated sheets that include a magnetic material.

8. The inductor element according to claim 1, wherein the coil includes a conductive metal and an insulative coating.

9. The inductor element according to claim 3, wherein the third portion includes a main portion with a flat plate shape and an extending portion with a third through-hole.

10. An inductor element comprising:

a magnetic body core provided with a first through-hole; and a coil inserted through the first through-hole and wound around the magnetic body core a plurality of times; wherein the coil includes:

a plurality of bonding portions;

a plurality of first conductor pieces provided on one side of the magnetic body core in a thickness direction; and a plurality of second conductor pieces provided on another side of the magnetic body core in the thickness direction;

the plurality of bonding portions are located on a first virtual plane that partially intersects with the coil;

at least one of the plurality of second conductor pieces includes:

a protruding portion that protrudes in the thickness direction and is bonded to at least one of the plurality of first conductor pieces; and a recessed portion provided at a portion of the at least one of the plurality of second conductor pieces corresponding to an opposite side of the protruding portion, and a bottom portion of the recessed portion corresponds to a tip end portion of the protruding portion;

the magnetic body core further includes a second through-hole that extends parallel or substantially parallel to the first through-hole in a first direction that is perpendicular or substantially perpendicular to the thickness direction; and a length of the first through-hole in a second direction that is perpendicular or substantially perpendicular to the thickness direction is different than a length of the second through-hole in the second direction that is perpendicular or substantially perpendicular to the thickness direction.

11. The inductor element according to claim 10, wherein the plurality of bonding portions are provided by respectively bonding a plurality of first bonding surfaces of a same number as the plurality of bonding portions and a plurality of second bonding surfaces respectively in surface contact with the plurality of first bonding surfaces; and the plurality of first bonding surfaces and the plurality of second bonding surfaces are located on the first virtual plane.

12. The inductor element according to claim 10, wherein the coil includes a plurality of first portions, a plurality of second portions, a third portion, and a fourth portion each of which has a flat plate shape;

the plurality of first portions are arrayed and inserted through the first through-hole;

the plurality of second portions is arrayed and inserted through the second through-hole;

the third portion connects one end of each of the plurality of first portions in a longitudinal direction and one end of each of the plurality of second portions in the longitudinal direction; and the fourth portion connects another end of each of the plurality of first portions in the longitudinal direction and another end of each of the plurality of second portions in the longitudinal direction.

13. The inductor element according to claim 12, wherein the plurality of bonding portions are located only on one side of the first through-hole and the second through-hole of the magnetic body core in the thickness direction.

14. The inductor element according to claim 10, wherein the first through-hole penetrates through the magnetic body core in the thickness direction of the magnetic body core.

15. The inductor element according to claim 12, wherein the first through-hole and the second through-hole are separated from each other in the longitudinal direction of the magnetic body core.

16. The inductor element according to claim 10, wherein the magnetic body includes laminated sheets that include a magnetic material.

17. The inductor element according to claim 10, wherein the coil includes a conductive metal and an insulative coating.

18. The inductor element according to claim 12, wherein the third portion includes a main portion with a flat plate shape and an extending portion with a third through-hole.

* * * * *